US008274515B2

(12) United States Patent  
Hiramatsu

(10) Patent No.: US 8,274,515 B2  
(45) Date of Patent: Sep. 25, 2012

(54) VECTOR IMAGE GENERATION METHOD, IMAGE PROCESSING APPARATUS, AND COMPUTER-READABLE STORAGE MEDIUM FOR COMPUTER PROGRAM

(75) Inventor: Naoko Hiramatsu, Kyoto (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 752 days.

(21) Appl. No.: 12/481,300

(22) Filed: Jun. 9, 2009

(65) Prior Publication Data

US 2009/0315892 A1 Dec. 24, 2009

(30) Foreign Application Priority Data

Jun. 18, 2008 (JP) ................................ 2008-159501

(51) Int. Cl.
*G06T 11/00* (2006.01)
(52) U.S. Cl. .................... 345/469; 345/441; 345/467
(58) Field of Classification Search ............... 345/467, 345/441, 469
See application file for complete search history.

(56) References Cited

U.S. PATENT DOCUMENTS

| 5,325,474 A * | 6/1994 | Kumazaki et al. ............. 345/611 |
| 5,694,331 A * | 12/1997 | Yamamoto et al. ............. 345/428 |
| 2001/0046322 A1 * | 11/2001 | Saiga ............................. 382/198 |

FOREIGN PATENT DOCUMENTS

| JP | 01-197890 | 8/1989 |
| JP | 5-046752 A | 2/1993 |
| JP | 5-268477 A | 10/1993 |
| JP | 7-006211 A | 1/1995 |
| JP | 2002-077566 A | 3/2002 |

OTHER PUBLICATIONS

Notification of Reason(s) for Refusal issued in the corresponding Japanese Patent Application No. 2008-159501 on May 25, 2010 and an English translation thereof.

* cited by examiner

*Primary Examiner* — Michelle L Sams
(74) *Attorney, Agent, or Firm* — Buchanan Ingersoll & Rooney PC

(57) ABSTRACT

A method for converting an image includes the steps of: obtaining an inclination of a character in the image; obtaining apex pixels forming contours of the character; obtaining an identical line segment candidate pixel group from a portion supposed to be expressed by a single line segment; extracting, based on the inclination, the identical line segment candidate pixel group as an identical line segment pixel group; obtaining both-end pixels which are apex pixels located on both sides of the identical line segment pixel group thus extracted; approximating, by a line segment connecting between the both-end pixels thus obtained, a contour of the character in a portion corresponding to the both-end pixels; and approximating a portion, excluding the portion that has been approximated, by a straight line or a curved line by performing an outlining process using apex pixels other than the apex pixels of the identical line segment pixel group.

19 Claims, 22 Drawing Sheets

VECTOR IMAGE GENERATION METHOD, IMAGE PROCESSING APPARATUS, AND COMPUTER-READABLE STORAGE MEDIUM FOR COMPUTER PROGRAM

This application is based on Japanese Patent Application No. 2008-159501 filed on Jun. 18, 2008, the contents of which are hereby incorporated by reference.

BACKGROUND OF THE INVENTION

1. Field of the Invention

The present invention relates to a vector image generation method, an image processing apparatus that generates a vector image, and so on.

2. Description of Related Art

It has recently become common to scan paper documents using a scanner and store the scanned documents in digitized form. The documents thus scanned by the scanner are stored, for example, as image data in a bitmap format.

The bitmap format expresses characters as a group of dots (pixels), and thus it is not necessary to perform complex calculations when displaying or printing those characters. However, the bitmap format has a disadvantage in that "jaggies" (aliasing artifacts) may be noticeably visible in the contours of the characters outputted, depending on the resolution of the apparatus (output apparatus) that outputs the characters.

In view of this, a process called "outlining" has therefore been conventionally performed so as to convert bitmap images into vector font images (vector images).

In a vector image, a character is reproduced by forming contour lines by approximating the contours of the character to straight lines and curved lines and then filling in the regions surrounded by those contour lines, which renders jaggies less apparent. Furthermore, because the outputted result does not depend on the resolution of the output apparatus, the image quality of character portions can be stabilized easily even if the output apparatus changes.

However, images that are scanned by a scanner are slightly inclined, usually. When the inclined characters are outlined, the contours of the characters may include aliasing artifacts or may be distorted. To cope with this, it can be conceived to reduce the distortion by correcting the inclination of the characters. In this respect, there have been proposed such methods as disclosed in JP-2002-077566-A and JP-H05-046752-A.

According to the method disclosed in JP-2002-077566-A, contours of images on the document are extracted, and the contours thus extracted are approximated by straight lines to thereby generate a plurality of straight lines. One is selected from among the plurality of straight lines thus generated as a straight line serving as a reference for correcting the inclination. Then, a rotation correction parameter required for correcting the inclination is calculated based on line segment information indicated by the selected line, and the inclination is corrected based on the rotation correction parameter.

According to the method disclosed in JP-H05-046752-A, first, an outline vector loop corresponding to framed graphics is detected from vector information of an image. Then, four apexes of the framed graphics are obtained based on a center point of a quadrate within which the outline vector is inscribed. Reference points corresponding respectively to the obtained four apexes are set up. Then, the inclination of drawing is corrected by rotating the coordinates around the respective reference points.

However, when the inclination correction process is performed on image data in a raster format prior to performing outlining, it involves a large amount of calculation and may take a long time.

Further, there may also be characters that are not inclined as a result of scanning but are intentionally arranged to incline. For such characters, the processing efficiency is further worsened because the processing involves outlining after an inclination correction process and, in addition, performing a process of reverting the inclination to the original inclination.

SUMMARY OF THE INVENTION

In view of these problems, it is an object of the present invention to make it possible to perform a process of converting an image in a raster format including inclined characters into an image in a vector format faster than conventionally possible while shapes of the characters are maintained neatly.

According to an embodiment of the present invention, a method for generating a vector image in an image forming apparatus includes the following steps. An inclination of a character included in an image is obtained. Apex pixels that form contours of the character are obtained. An identical line segment candidate pixel group serving as a candidate for a pixel group of the apex pixels that are supposed to be positioned on the single line segment is obtained from a portion that is supposed to be expressed by a single line segment among the contours of the character. The identical line segment candidate pixel group thus obtained is extracted, based on the inclination, as an identical line segment pixel group that is the pixel group of the apex pixels that are supposed to be positioned on the single line segment. Both-end pixels which are apex pixels located on both sides of the identical line segment pixel group are extracted from among the apex pixels of the identical line segment pixel group based on a position of each of the apex pixels of the identical line segment pixel group thus extracted. A contour of the character in a portion corresponding to the both-end pixels is approximated by a line segment connecting between the both-end pixels thus extracted. A portion among the contours of the character, excluding the portion that has been approximated by the line segment connecting between the both-end pixels, is approximated by a straight line or a curved line by performing an outlining process using apex pixels other than the apex pixels of the identical line segment pixel group.

DESCRIPTION OF THE PREFERRED EMBODIMENTS

Figure 1:
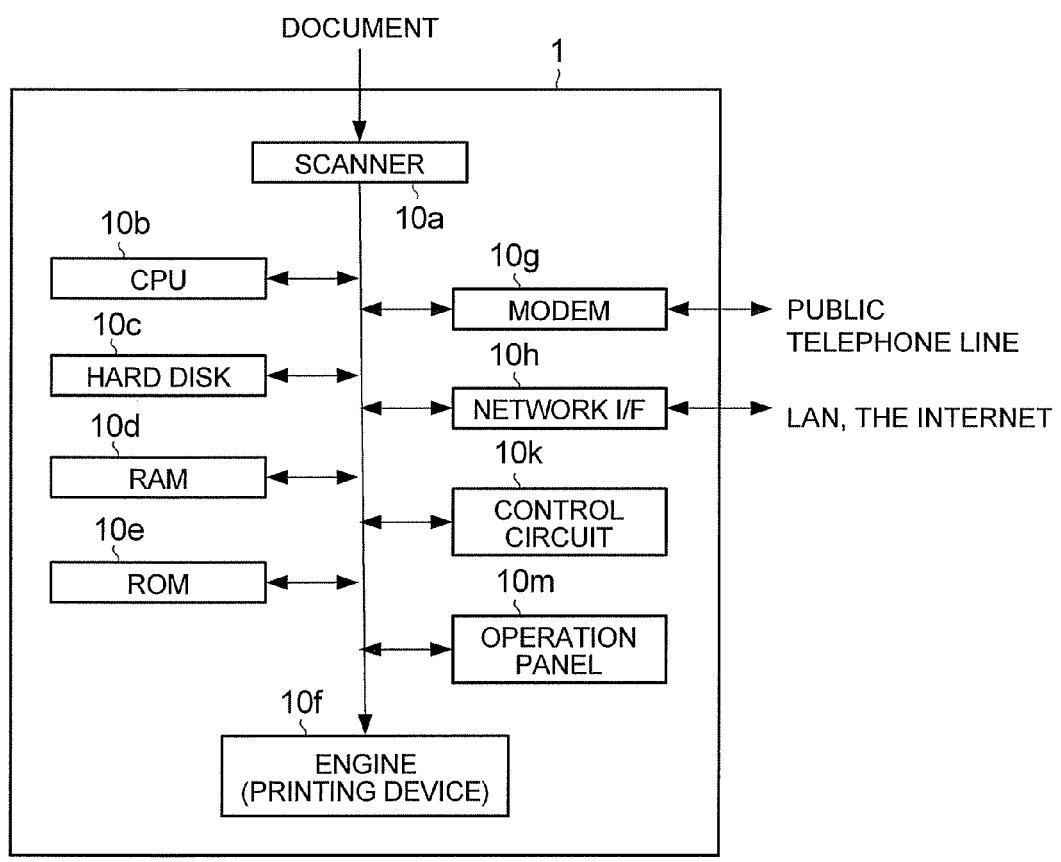
FIG. 1 is a diagram illustrating an example of a hardware configuration of an image forming apparatus according to an embodiment of the present invention.

FIG. 1 is a diagram illustrating an example of a hardware configuration of an image forming apparatus 1 according to an embodiment of the present invention.

The image forming apparatus 1 is an image processing apparatus that integrates a variety of functions, such as copying, scanning, faxing, network printing, document server functionality, file transfer functionality, and so on. Such apparatuses are also sometimes called combination machines or MFPs (Multi-Function Peripherals).

As shown in FIG. 1, the image forming apparatus 1 is configured of a scanner 10a, a CPU 10b, a hard disk 10c, a RAM 10d, a ROM 10e, a printing device 10f, a modem 10g, a network interface 10h, a control circuit 10k, an operational panel 10m, and so on.

The scanner 10a is a device that optically scans images such as photographs, characters, drawings, charts, and so on that are printed on a paper document (hereinafter, simply referred to as "document") and creates digital data thereof. The scanned image is stored as full-color image data expressed as RGB (R (red), G (green), and B (blue)) in a format such as TIFF, JPEG, or bitmap. It is also possible to store the image data in PDF format (Portable Document Format) by specifying that format in advance.

The CPU 10b performs processing for converting the image data of the document scanned by the scanner 10a into a file in a format such as TIFF, JPEG, bitmap, or PDF. The CPU 10b also performs overall control of the image forming apparatus 1, such as detecting input from a user, controlling displays made in the operational panel 10m, and the creation of e-mail.

The printing device 10f is a device for printing, onto paper, an image representing the image data scanned by the scanner 10a or an image representing image data sent from another device. In the case where the image forming apparatus 1 is capable of color printing, the printing is performed using four colors of toner, namely, yellow, magenta, cyan, and black.

The operational panel 10m is a device through which the user makes various inputs with respect to the image forming apparatus 1 and is configured of an operation portion, a display portion, and so on. Using the operational panel 10m, the user can perform various operations, such as selecting a format in which to store image data, setting scanning conditions, inputting commands to start or execute processes, and inputting e-mail addresses.

The modem 10g incorporates an NCU (Network Control Unit) and connects to another fax terminal via an analog public line to perform data control and modulation/demodulation of fax data based on a facsimile protocol, and so on.

The network interface 10h is an NIC (Network Interface Card) and connects to another device via a LAN, the Internet, or the like.

The control circuit 10k is a circuit for controlling devices such as the hard disk 10c, the operational panel 10m, the scanner 10a, the printing device 10f, the modem 10g, and the network interface 10h. The control circuit 10k is configured of, for example, hardware circuits using various electronic components.

The hard disk 10c stores programs (computer programs), data, and so on for implementing the functions of the various portions described later using FIG. 2. These are read out and stored as necessary in the RAM 10d, and the programs are executed by the CPU 10b. Part or all of these programs or data may be stored in the ROM 10e. Alternatively, some or all of the functions shown in FIG. 2 may be implemented by the control circuit 10k.

Figure 2:
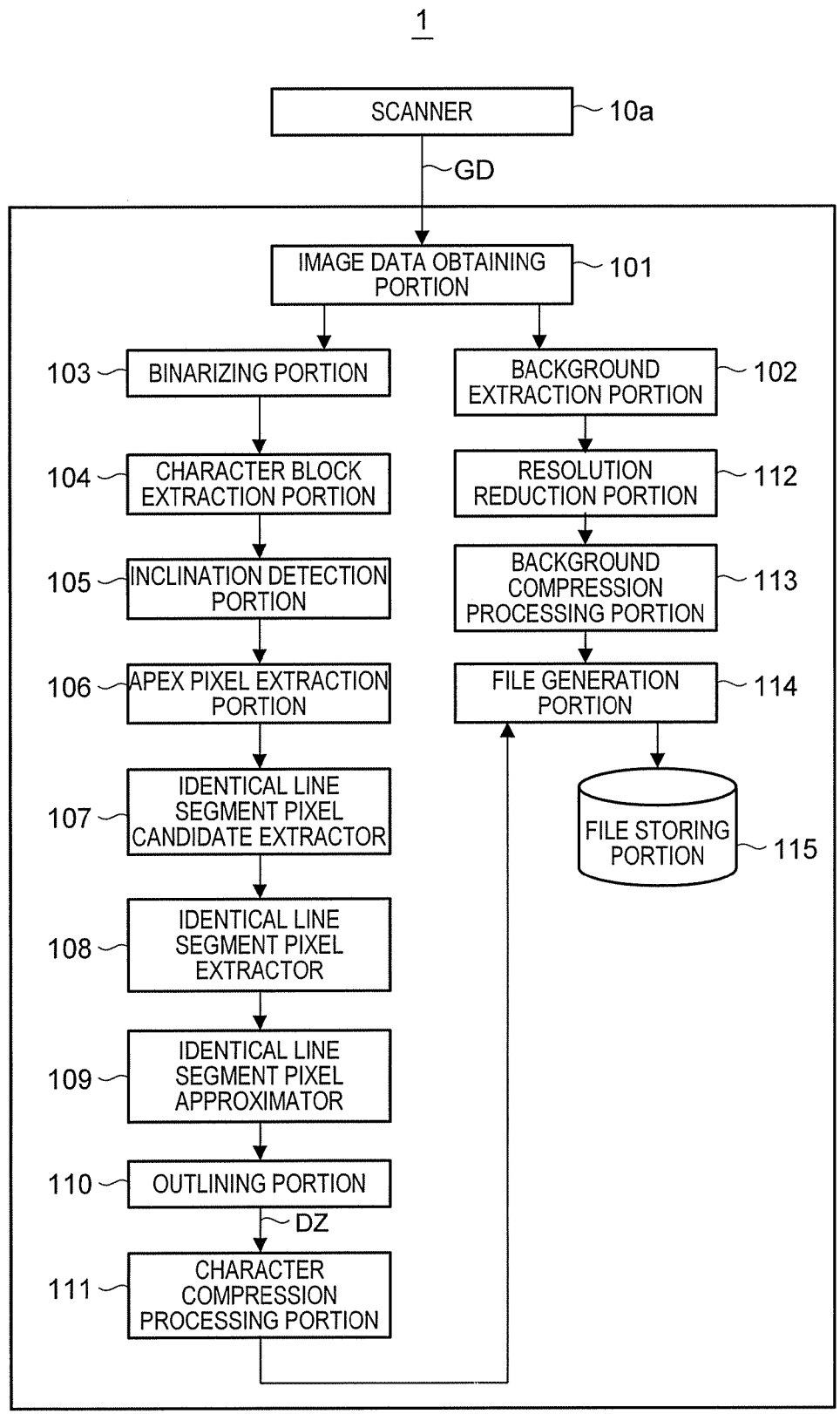
FIG. 2 is a diagram illustrating an example of a functional configuration of the image forming apparatus.
Figure 3A:
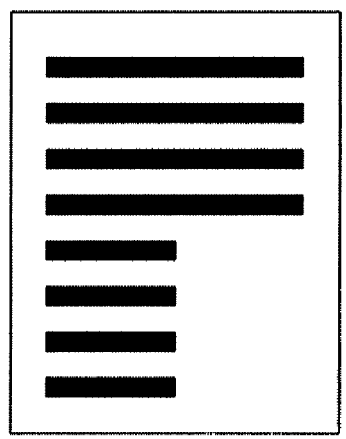
FIGS. 3A, 3B, and 3C are diagrams illustrating a document image, and a character region and background region included in the document image.
Figure 3B:
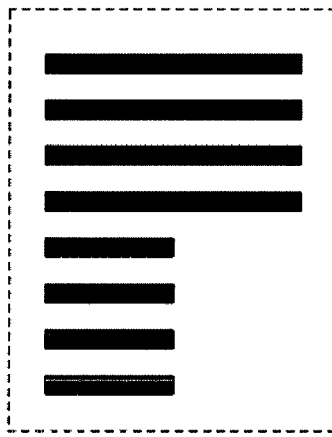
Figure 3C:
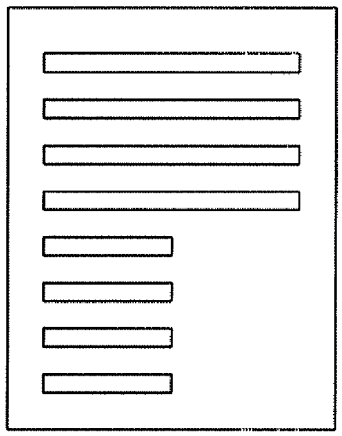
Figure 4A:
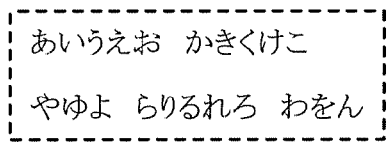
FIGS. 4A, 4B, 4C, 4D, and 4E are diagrams depicting a process of extracting a character block.
Figure 5A:
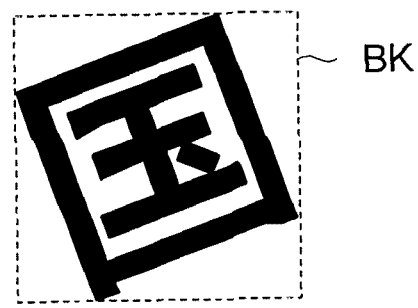
FIGS. 5A, 5B, and 5C are diagrams depicting a process of detecting an inclination of a character.
Figure 5B:
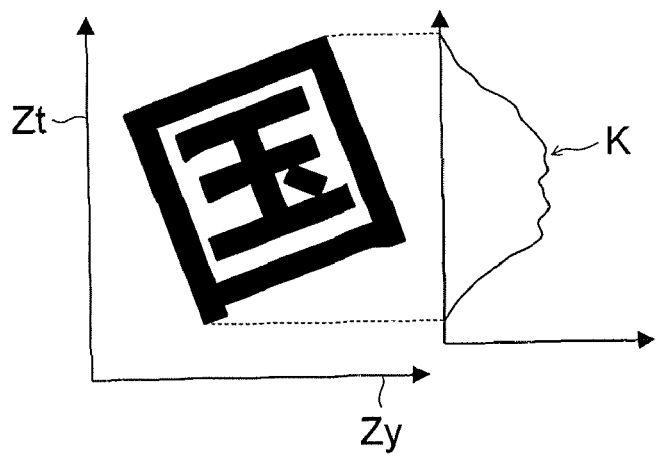
Figure 5C:
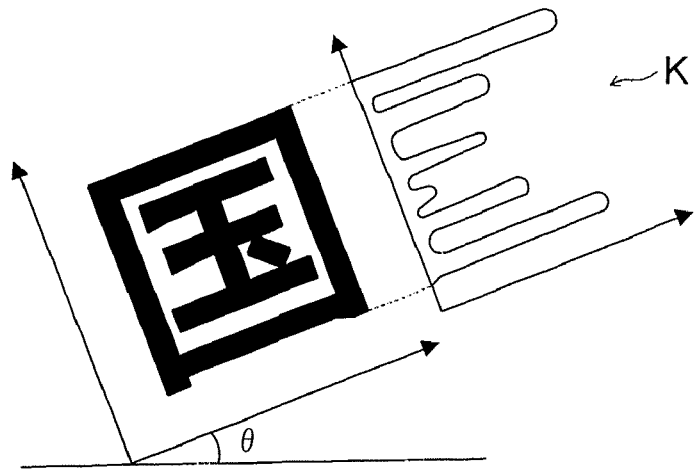
Figure 6:
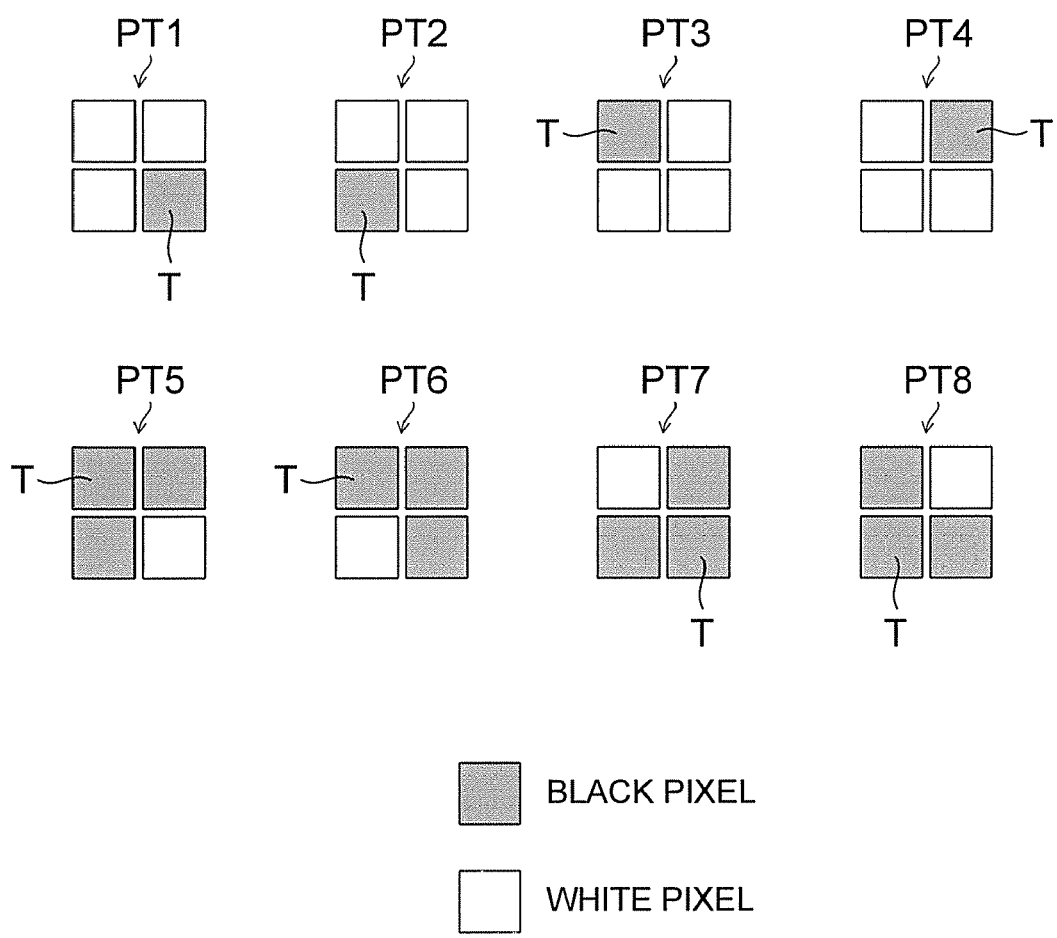
FIG. 6 is a diagram illustrating examples of apex detection patterns.
Figure 7A:
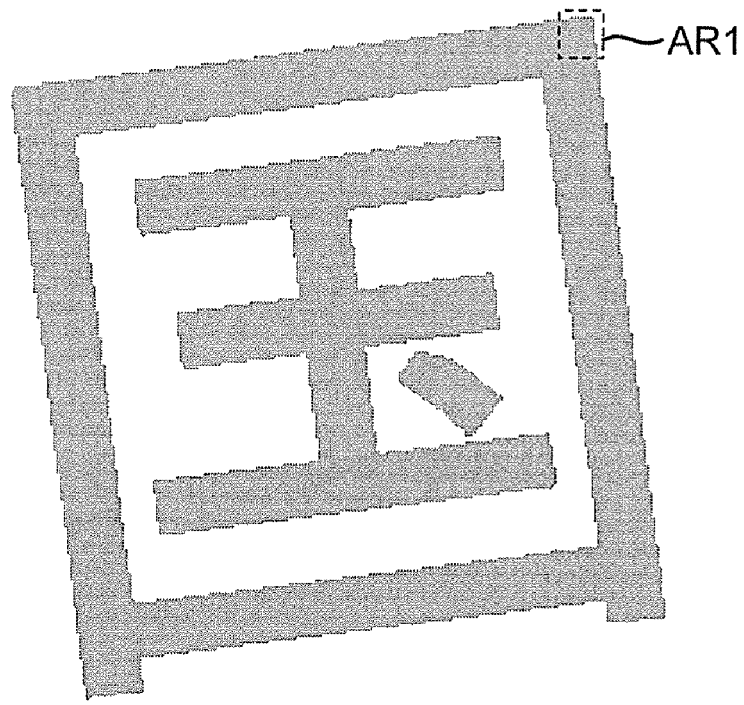
FIGS. 7A and 7B are diagrams illustrating examples of apex pixels in a specific portion of a first specific Japanese character.
Figure 7B:
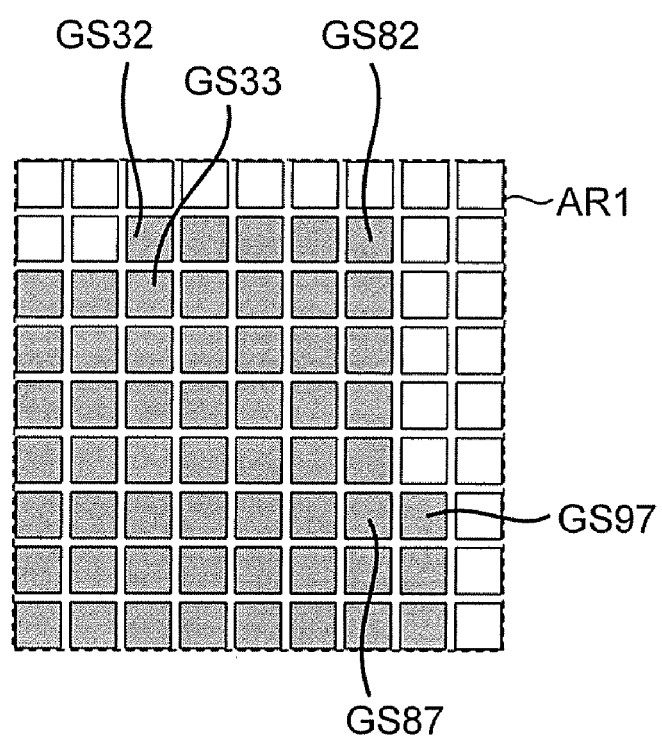
Figure 8:
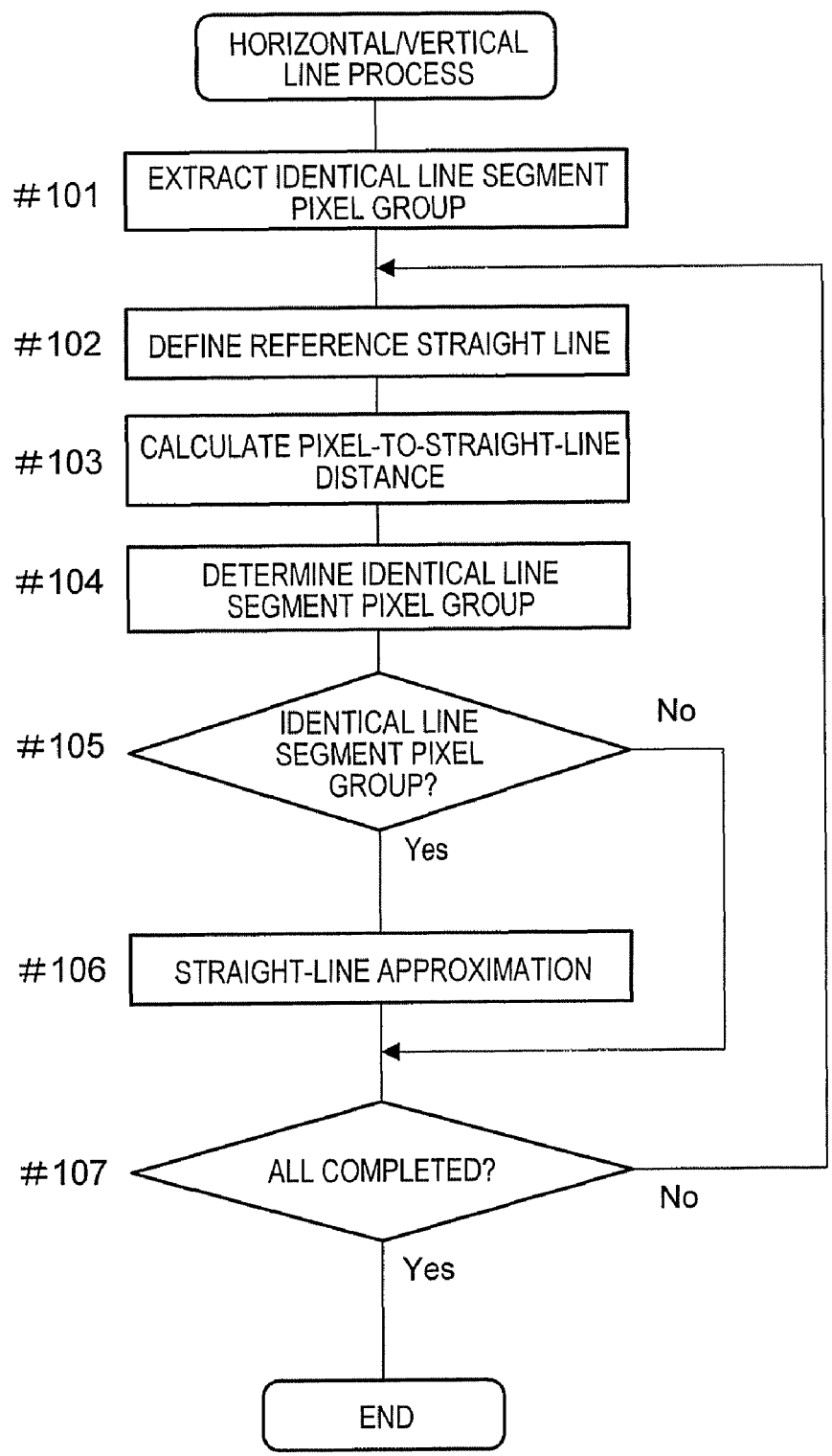
FIG. 8 is a flowchart for explaining a flow of a horizontal/vertical line process.
Figure 9A:
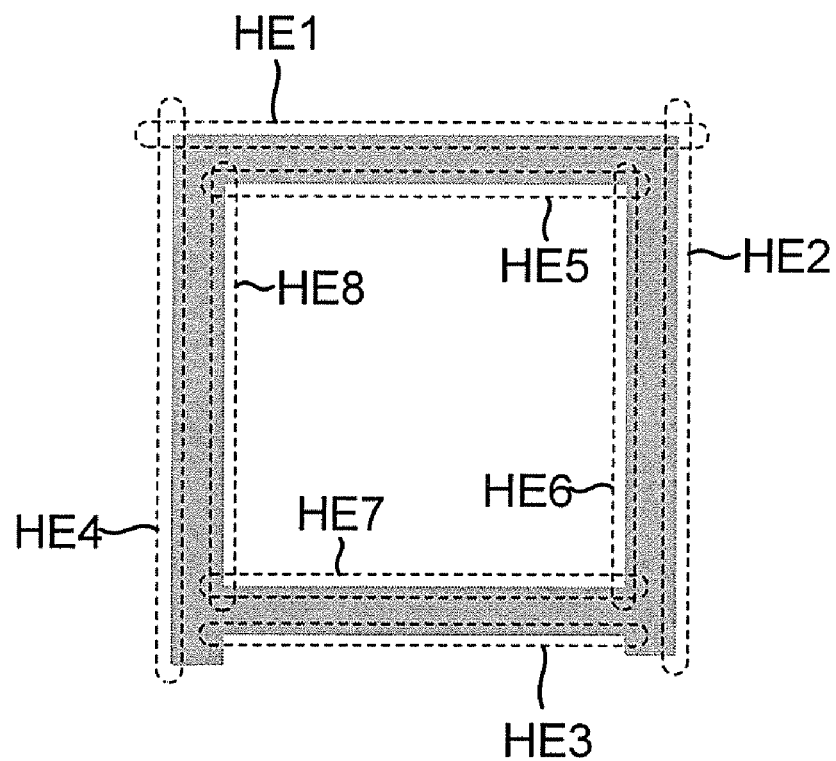
FIGS. 9A and 9B are diagrams illustrating examples of vertical and horizontal line segments included in contours of the character.
Figure 9B:
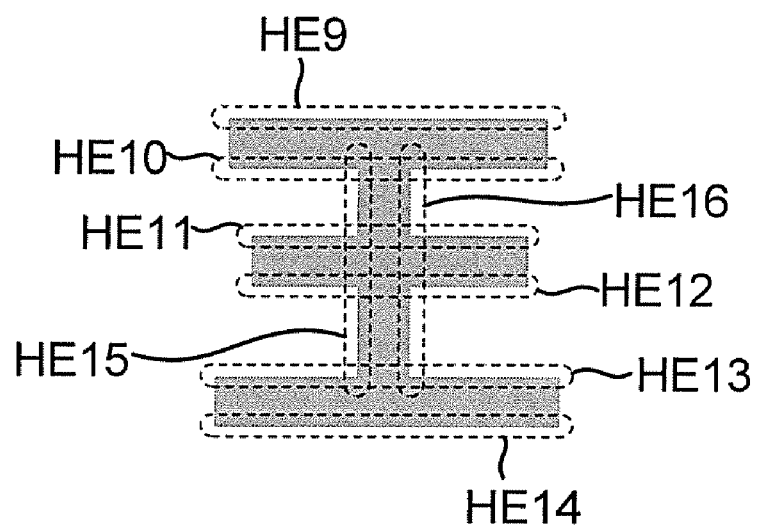
Figure 10A:
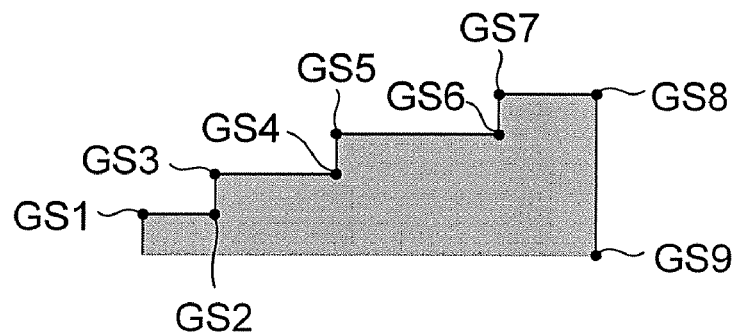
FIGS. 10A, 10B, and 10c are diagrams for explaining a process of extracting an identical line segment candidate pixel group.
Figure 10B:
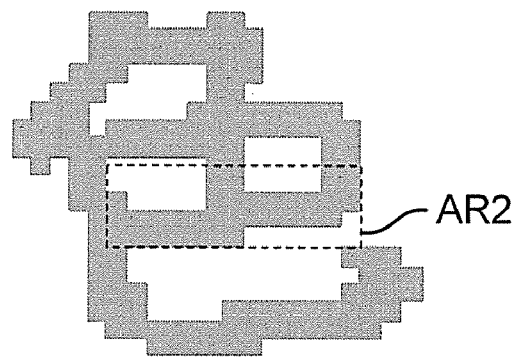
Figure 10C:
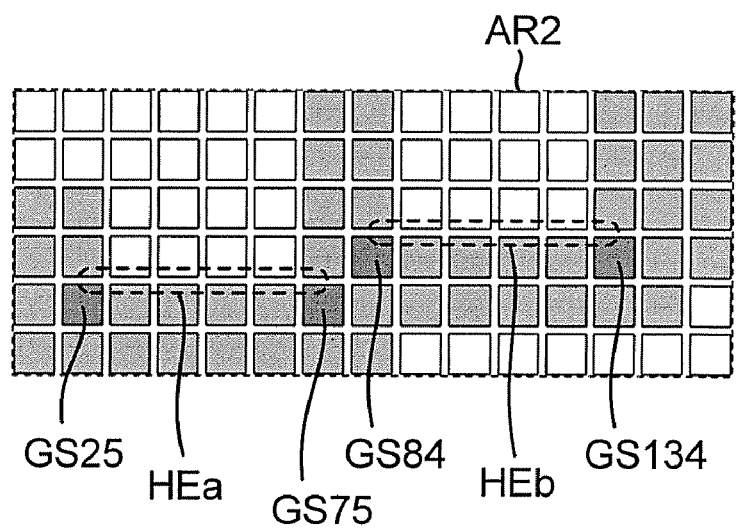
Figure 11A:
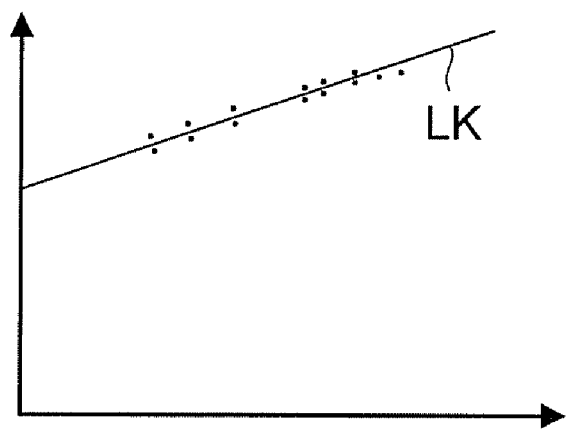
FIGS. 11A and 11B are diagrams illustrating examples of reference straight lines.
Figure 11B:
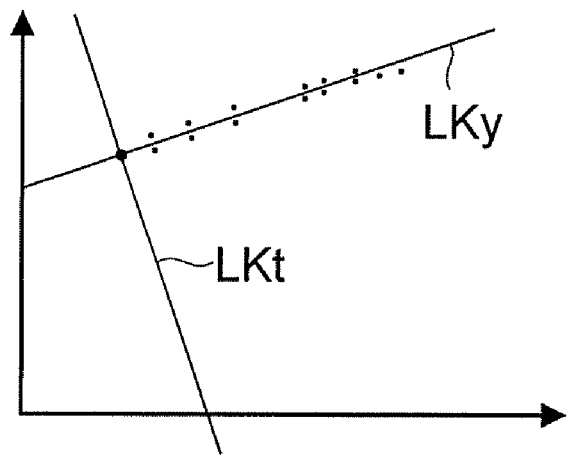
Figure 12A:
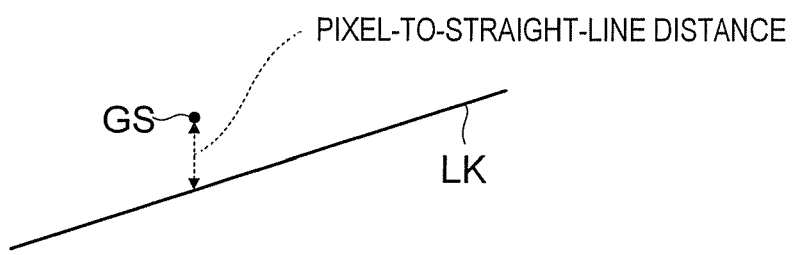
FIGS. 12A, 12B, and 12C are diagrams illustrating examples of pixel-to-straight-line distances.
Figure 12B:
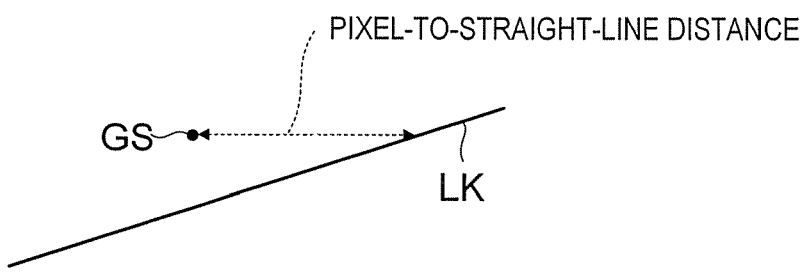
Figure 12C:
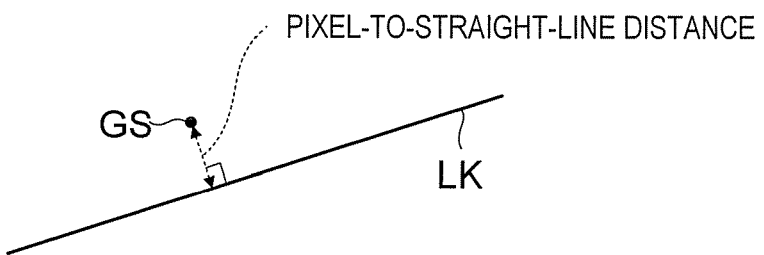
Figure 13A:
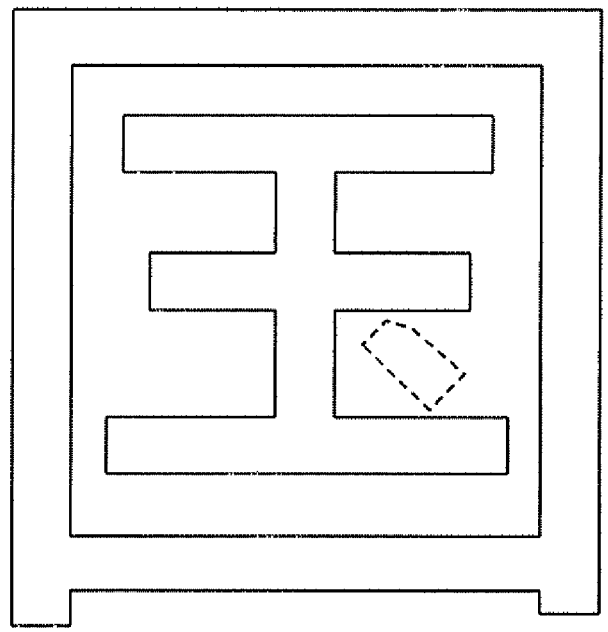
FIGS. 13A and 13B are diagrams illustrating contours of approximated portion.
Figure 13B:
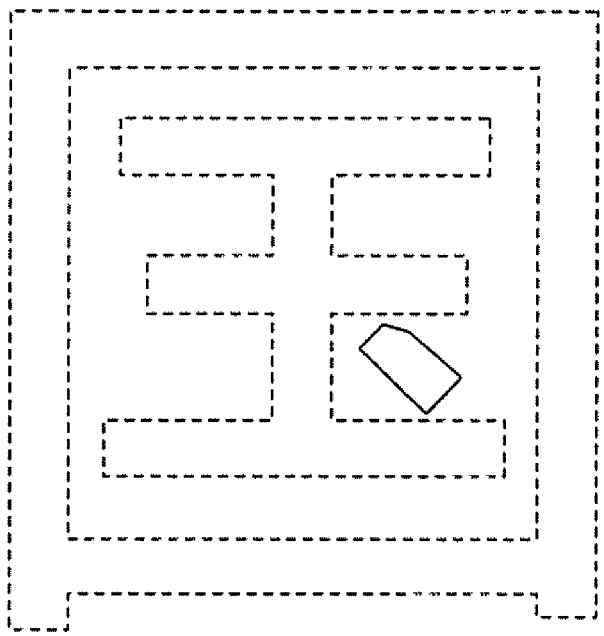

FIG. 2 is a diagram illustrating an example of a functional configuration of the image forming apparatus 1; FIGS. 3A, 3B, and 3C are diagrams illustrating a document image, and a character region and background region included in the document image; FIGS. 4A, 4B, 4C, 4D, and 4D are diagrams depicting a process of extracting a character block BK; FIGS. 5A, 5B, and 5C are diagrams depicting a process of detecting an inclination of a character; FIG. 6 is a diagram illustrating examples of apex detection patterns PT; FIGS. 7A and 7B are diagrams illustrating examples of apex pixels in a specific portion AR1 of a first specific Japanese character; FIG. 8 is a flowchart for explaining a flow of a horizontal/vertical line process; FIGS. 9A and 9B are diagrams illustrating examples of vertical and horizontal line segments included in contours of the character; FIGS. 10A, 10B, and 10c are diagrams for explaining a process of extracting an identical line segment candidate pixel group; FIGS. 11A and 11B are diagrams illustrating examples of reference straight lines; FIGS. 12A, 12B, and 12C are diagrams illustrating examples of pixel-to-straight-line distances; FIGS. 13a and 13B are diagrams illustrating contours of approximated portion; FIGS. 14A, 14B, 14C, 15A, and 15B are diagrams for explaining steps of an outlining process; and FIGS. 16A, 16B, 17A, and 17B are diagrams illustrating examples of a document image including character strings having different inclinations.

Next, a description will be given of a process performed by each portion of the image forming apparatus 1 when a file in PDF format (PDF file) is generated and stored from image data (hereinafter, referred to as "document image data GD")

resulted from scanning a document carrying text of a plurality of lines as illustrated in FIG. 3A by the scanner 10a.

In general, some inclination may be caused when a document is scanned by a scanner. In this embodiment, a document image data GD representing an inclined image is to be processed. Each of horizontal bars in black color illustrated in FIGS. 3A and 3B indicates a one-line sentence. Hereinafter, an image represented by the document image data GD is referred to as "document image".

As illustrated in FIG. 2, the image forming apparatus 1 is configured of an image data obtaining portion 101, a background extraction portion 102, a binarizing portion 103, a character block extraction portion 104, an inclination detection portion 105, an apex pixel extraction portion 106, an identical line segment pixel candidate extractor 107, an identical line segment pixel extractor 108, an identical line segment pixel approximator 109, an outlining portion 110, a character compression processing portion 111, a resolution reduction portion 112, a background compression processing portion 113, a file generation portion 114, a file storing portion 115, and so on.

When a user places a document in the scanner 10a and inputs commands to start scanning, the image forming apparatus 1 scans the document and generates document image data GD in a bitmap format.

The image data obtaining portion 101 obtains the document image data GD. The background extracting portion 102 performs a process of extracting pixels of a background portion of the document image as illustrated in FIG. 3C. This process is implemented, for example, by extracting, as pixels of background, pixels having a density value lower than a threshold value in each of RGB colors.

The binarizing portion 103 generates an image having binarized data (binary image) by binarizing the document image. Hereinafter, the binary image generated by the binarizing portion 103 and corresponding to the document image is referred to as "binary document image".

The character block extraction portion 104 performs a process of extracting a character portion included in the document image as illustrated in FIG. 3B by performing labeling on the binary document image. This process is implemented, for example, in the following manner.

A black pixel group formed of consecutive black pixels indicated in the binary document image is detected. Black pixel groups spaced each other within a distance smaller than a predetermined threshold value are detected as a single black pixel group. It is also possible to detect a single character as a single black pixel group by adjusting the threshold value. Alternatively, it is also possible to detect, as a single black pixel group, a character string formed of characters spaced relatively close to each another, or it may be arranged in such a way that a single text line may be detected as a single black pixel group.

Next, a region in a rectangular shape (rectangular region) including the detected black pixel groups is identified. In other words, for example, when the top-left corner of the binary document image is taken as the origin, the coordinates of a top-left corner pixel and a bottom-right corner pixel are obtained. Hereinafter, the rectangular region may be referred to as "block BK".

Alternatively, the character block extracting portion 104 may be arranged to extract the block BK in the following manner.

In the document image, a portion in which pixels having the same attribute such as color or brightness are consecutively arranged is searched for. Among such pixel groups, pixel groups spaced from each another within a predetermined distance are arranged as a single pixel group, and a rectangular region including such a pixel group is identified. With this arrangement, for example, a rectangular region encompassing text extending over a plurality of lines as shown in FIG. 4A is extracted. Then, the image in the rectangular region thus extracted is binarized.

Figure 4B:
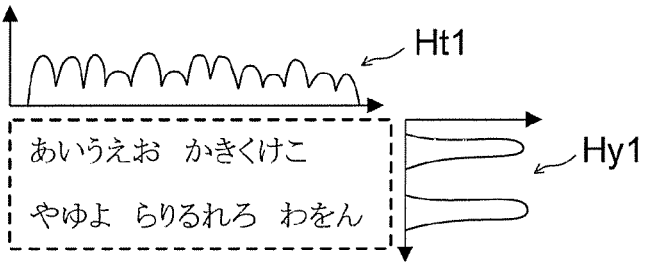

Then, as illustrated in FIG. 4B, a histogram Ht1 depicting a relationship between quantities of black pixels and their vertical positions and a histogram Hy1 depicting a relationship between quantities of black pixels and their horizontal positions are generated for the binarized image in the rectangular region.

Figure 4C:
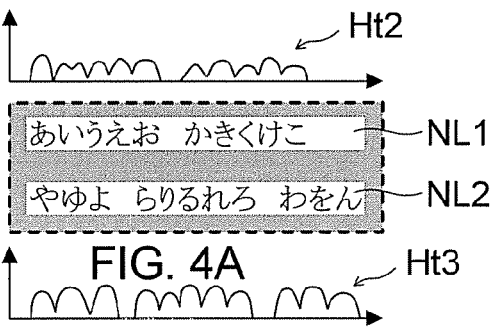
Figure 4D:
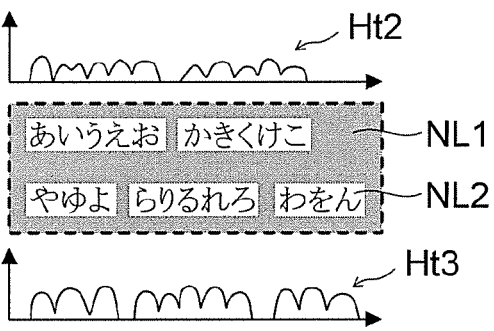
Figure 4E:

Portions where the quantities are equal to or smaller than predetermined threshold values are searched for in the horizontal and vertical directions on the histograms Ht1 and Hy1, respectively, and labeling is performed on pixels in the portions thus searched for (portions shown in grey in FIG. 4C). Next, as illustrated in FIG. 4C, histograms Ht2 and Ht3 depicting the relationships between quantities of black pixels and their horizontal positions are generated for the regions NL1 and NL2 which are left unlabeled, respectively. Hereinafter, the histograms Ht1, Ht2, . . . may be collectively referred to as "histogram Ht". Likewise, other data or components may be collectively referred to by omitting a serial number or alphabetical characters added to the end of reference numerals or symbols.

For each of the regions NL1 and NL2, portions in which the quantity is equal to or smaller than a threshold value are searched for in the corresponding histogram Ht, and labeling is performed on pixels in such portions. By this process, a rectangular region encompassing portions (portions excluding regions shown in grey in FIG. 4D) which are left unlabeled is extracted as a block BK. In this example, regions NL11, NL12, NL21, NL22, and NL23 are extracted as blocks BK. Such a rectangular region covering a single text line such as the region NL1 or NL2 as shown in FIG. 4C can be extracted as a block BK by generating a histogram Hy1 by which a region between text lines can be discriminated.

The inclination detection portion 105 obtains an inclination of a character in each of the blocks BK thus extracted. Here, a description will be given of how the inclination can be obtained, with reference to FIGS. 5A-5C.

FIG. 5A illustrates a block BK defined for a first specific Japanese character. First, axes Zt and Zy perpendicularly crossing each other are defined as illustrated in FIG. 5B. A binary image (partial binary image) of a portion corresponding to the block BK of a binary document image is scanned in a direction of the axis Zy to obtain a histogram K depicting a relationship between the quantity of black pixels and their positions in a direction of the axis Zt. By tilting the axes Zt and Zy, the histogram K is obtained at each of predetermined angles. Then, the histogram K such as the one illustrated in FIG. 5C where a difference between minimum and maximum values becomes maximum in the histogram K is obtained. In the histogram K thus obtained, an angle $\theta$ of the axis Zy relative to the horizontal direction is stored as an inclination angle of the character in the block BK. An inclination of a character is expressed by $\tan(\theta)$ when the symbol $\theta$ represents an inclination angle.

The histogram K may be generated for each of the directions of the axes Zt and Zy or may be generated for only one of the directions as exemplified in FIG. 5C. Alternatively, it is also possible to generate the histogram K and obtain the inclination by using an image obtained by reducing the resolution of the partial binary image of the block BK.

The apex pixel extraction portion 106 extracts pixels in the apexes (apex pixel) of characters within each block BK. This detection process is performed using pattern matching by using apex detection patterns PT1-PT8 shown in FIG. 6, which are patterns (arrangement patterns) of the arrangement of white and black pixels used for detecting apex pixels. In other words, the partial binary image within the block BK is searched for a portion that matches one of the apex detection patterns PT1-PT8, and from the pixels in the matching portion, the pixel positioned at an apex position T in the matching apex detection pattern PT is extracted as the apex pixel.

FIG. 7B is an enlarged diagram of a specific portion AR1 of the first specific Japanese character as illustrated in FIG. 7A. In the case of the example illustrated in FIG. 7B, as a result of a process carried out by the apex pixel extraction portion 106, pixels GS32, GS33, GS82, GS87, and GS97 are extracted as apex pixels.

It is also possible to trace a contour starting from any given pixel that forms the contour of a character and extract, as an apex pixel, a pixel at a point in which the contour changes its direction.

The identical line segment pixel candidate extractor 107, the identical line segment pixel extractor 108, the identical line segment pixel approximator 109 carry out a horizontal/vertical line process in cooperation with each another. This process will be described with reference to the flowchart in FIG. 8.

The identical line segment pixel candidate extractor 107 obtains, from a portion (side) that is supposed to be expressed by a single line segment in a transverse direction or a longitudinal direction among contours of a character within each block BK, a candidate (hereinafter, referred to as "identical line segment candidate pixel group") for an apex pixel group (hereinafter, referred to as "identical line segment pixel group") which is supposed to be positioned in the identical single line segment (#101 in FIG. 8).

The transverse and longitudinal directions correspond to horizontal and vertical directions, respectively, when the character is not inclined. The portion that is supposed to be expressed by a single line segment in a transverse direction or a longitudinal direction among contours of a character corresponds to each of sides HE1-HE8, i.e., each side extending in a transverse or longitudinal direction from one corner to another of each of the contours forming an outer portion of the first specific Japanese character as illustrated in FIG. 9A, or corresponds to each of sides HE9-HE16, i.e., each side extending in a transverse or longitudinal direction, of the contours forming an inner portion of the first specific Japanese character as illustrated in FIG. 9B.

The identical line segment pixel candidate extractor 107 extracts, as an identical line segment candidate pixel group, a plurality of apex pixels that satisfy all of the conditions described in (A1) to (A4) below from among the apex pixels that have been extracted by the apex pixel extraction portion 106.

(A1) A plurality of apex pixels are positioned in a step-like pattern as illustrated in FIG. 10A.
(A2) A length of contours forming the step-like pattern (distance between apex pixels GS1 and GS8 in the example in FIG. 10A) is equal to or longer than a predetermined length (first length).
(A3) A distance between apex pixels that form the step-like contours and are adjacent to each other in a horizontal direction is within a predetermined distance range (first horizontal distance range).
(A4) A distance between apex pixels that form the step-like contours and are adjacent to each other in a vertical direction is within a predetermined distance range (first vertical distance range).

In the case of the example illustrated in FIG. 10A, the apex pixels GS1-GS8 form the step-like contours. It is possible to determine whether or not it is a step-like shape by a direction of a vector connecting adjacent apex pixels GS. Therefore, if individual distances between the apex pixels GS1 and GS2, GS3 and GS4, GS5 and GS6, and GS7 and GS8 are within the first horizontal distance range; individual distances between the apex pixels GS2 and GS3, GS4 and GS5, and GS6 and GS7 are within the first vertical distance range; and a distance between the apex pixels G1 and G8 is equal to or greater than the first length, the pixel group of the apex pixels GS1-GS8 satisfies all of the aforementioned conditions (A1)-(A4) and therefore is extracted as belonging to an identical line segment candidate pixel group.

The identical line segment pixel candidate extractor 107 also extracts, as an identical line segment candidate pixel group, a pixel group that satisfies both of the conditions described in (B1) and (B2) below.
(B1) A character including the pixel group is smaller than a predetermined size (threshold size).
(B2) A distance between adjacent apex pixels is within a predetermined distance range (second distance range).

FIG. 10C is an enlarged view of a specific portion AR2 of a second specific Japanese character illustrated in FIG. 10B. If the second specific Japanese character is smaller than the predetermined size, then the condition described above in (B1) is fulfilled. Additionally, if a distance between apex pixels GS25 and GS75 adjacent to each other is within a second distance range, these apex pixels GS25 and GS75 are extracted as the identical line segment candidate pixel group. If a distance between apex pixels GS84 and GS134 is within the second distance range, these apex pixels GS84 and GS134 are also extracted as the identical line segment candidate pixel group. Incidentally, it is also possible to bundle and extract the identical line segment candidate pixel groups located in the vicinity thereof together as a single identical line segment candidate pixel group. More specifically, in the example illustrated in FIG. 10C, the apex pixels GS25, GS75, GS84, and GS134 may be extracted as a single identical line segment candidate pixel group.

As a character size, a longitudinal length of the block BK (length in a vertical direction) may also be used. Alternatively, when each block BK is defined for each character, a size defined by longitudinal and transverse lengths of the block BK may be used as a size of a character.

The identical line segment pixel extractor 108 carries out a process of extracting an identical line segment pixel group by making determination on each identical line segment candidate pixel group using the inclination obtained by the inclination detection portion 105.

Then, an identical line segment candidate pixel group to be determined is selected. A reference straight line LK which is a straight line to be used for determination of the identical line segment candidate pixel group is defined (#102 in FIG. 8).

If the identical line segment candidate pixel group relates to a line segment in a transverse direction of the contours of the character such as the side HE1 in FIG. 9A, a straight line having the inclination obtained by the inclination detection portion 105 is defined as the reference straight line LK. In other words, if the obtained inclination angle is, for example, 10 degrees, the inclination a of the reference straight line is expressed as a=tan (10). Furthermore, values of coordinates (x1, y1) of any given apex pixel belonging to the identical line segment candidate pixel group and a value of the inclination a thus obtained are substituted into an equation y=ax+b to calculate an intercept b so that a reference straight line LK passing through the apex pixels GS as illustrated in FIG. 11A is obtained. Here, as a method to calculate the intercept b, it is also possible to use an average value of two values of b that are calculated by substituting, into the equation, two sets of coordinates of apex pixels located at each end of the identical line segment candidate pixel group. Alternatively, individual sets of coordinates of individual apex pixels GS in the identical line segment candidate pixel group may be substituted into the equation, and an average value of individual values of b may be used as the intercept b.

Next, a distance between each of the apex pixels GS belonging to the identical line segment candidate pixel group and the reference straight line LK is obtained (#103). Hereinafter, the distance between the apex pixel GS and the reference straight line LK is referred to as "pixel-to-straight-line distance". For example, a distance in a vertical direction as illustrated in FIG. 12A is used as the pixel-to-straight-line distance. In that case, the pixel-to-straight-line distance is expressed as a difference between a value y obtained when an x coordinate value of the apex pixel GS is substituted into the expression of the reference straight line LK and a y coordinate value of the apex pixel GS. Alternatively, the pixel-to-straight-line distance may be expressed by a horizontal distance as illustrated in FIG. 12 or by a distance perpendicular to the reference straight line LK as illustrated in FIG. 12C.

A distance in a vertical direction may be used as the pixel-to-straight-line distance as illustrated in FIG. 12A if the inclination angle is 45 degrees or smaller, and a distance in a horizontal direction may be used as the pixel-to-straight-line distance as illustrated in FIG. 12B if the inclination angle is greater than 45 degrees. This means that a direction in which the pixel-to-straight-line distance becomes smaller may be used. In this way, variations in the pixel-to-straight-line distance can be reduced, leading to improvement in calculation efficiency.

Then, if the pixel-to-straight-line distances for all of the apex pixels GS belonging to the identical line segment candidate pixel group are within a predetermined distance range (third distance range), the identical line segment candidate pixel group is determined as an identical line segment pixel group (#104).

On the other hand, if an identical line segment candidate pixel group relates to a longitudinal line segment of contours of the character such as the side HE2 illustrated in FIG. 9A, a straight line crossing, at a right angle, the straight line having the inclination obtained by the inclination detection portion 105 is defined as the reference straight line LK (#102). Hereinafter, the reference straight line LK may be separately defined. To be specific, the reference straight line LK obtained by the inclination detection portion 105 is referred to as "reference straight line LKy", and a straight line crossing, at a right angle, the straight line having the inclination obtained by the inclination detection portion 105 is referred to as "reference straight line LKt". To be more specific, if the inclination obtained by the inclination detection portion 105 is defined as a, the reference straight line LKt has the inclination of $-1/a$ and is expressed by an expression of $y=(-1/a)x+b$. The reference straight line LKt is a straight line crossing the reference straight line LKy at a right angle as illustrated in FIG. 11B.

Next, a horizontal distance between each of the apex pixels GS belonging to an identical line segment candidate pixel group and the reference straight line LKt is obtained as a pixel-to-straight-line distance (#103). In this case, the pixel-to-straight-line distance is expressed as a difference (x difference) between a value x obtained when an y coordinate value of the apex pixel GS is substituted into the expression of the reference straight line LKt and an x coordinate value of the apex pixel GS. Alternatively, the pixel-to-straight-line distance may be expressed by a horizontal distance between the apex pixel GS and the reference straight line LKt or by a distance therebetween perpendicular to the reference straight line LKt.

Then, if the pixel-to-straight-line distances for all of the apex pixels GS belonging to the identical line segment candidate pixel group are within a predetermined distance range (third distance range), the identical line segment candidate pixel group is determined as an identical line segment pixel group (#104).

The third distance range is obtained based on a predetermined rule in accordance with which reference straight line is used, i.e., LKt or LKy. The reference straight line LK may be obtained for each of the identical line segment candidate pixel groups, or a common reference straight line LK may be used for each of the identical line segment candidate pixel groups. When the common reference straight line LK is used for each of the identical line segment candidate pixel groups, the third distance range is obtained correspondingly for each identical line segment candidate pixel group on the basis of a predetermined rule, and, by using the result, it is determined whether or not each identical line segment candidate pixel group is an identical line segment pixel group.

The first length, the first horizontal distance range, the first vertical distance range, the second distance range, the third distance range, and the threshold size are determined in accordance with such factors as the inclination obtained by the inclination detection portion 105 and the character size.

The identical line segment pixel approximator 109 approximates a portion that is supposed to be expressed by a single line segment in a transverse direction or a longitudinal direction of contours of a character to a straight line using the identical line segment pixels. The process is specifically performed in the following manner.

Pixels (both-end pixels) located at both ends of the identical line segment pixel group extracted by the identical line segment pixel extractor are extracted. A contour of a character in a portion corresponding to the identical line segment pixel group is approximated by a line segment connecting the both-end pixels (Yes in #105 and #106 in FIG. 8) to each other. To be more specific, the both-end pixels are stored as pixels at both ends of the contour portion. Then, such a process will be repeated for all of the identical line segment pixel groups that have been extracted (No in #107).

As illustrated by solid lines in FIG. 13A, according to the example of the first specific Japanese character, each portion that is supposed to be expressed by a single line segment in transverse and longitudinal directions of the character is approximated by a line segment connecting the both-end pixels, as a result of the aforementioned process.

The outlining portion 110 approximates a portion of contours of the character other than the portion that is approximated by the line segment connecting to the both-end pixels. This means that, in the case of the example of the first specific Japanese character, portions illustrated by solid lines in FIG. 13B are approximated by straight lines or curved lines.

In this process, the outlining portion 110 first performs straight-line approximation using apex pixels GS, excluding the apex pixels (identical line segment pixels) GS belonging to the identical line segment pixel group, among individual apex pixels GS extracted by the apex pixel extraction portion 106, and thereafter performs curve approximation on the contours that have been subjected to the straight-line approximation. Hereinafter, the line segment to be subjected to the straight-line approximation is referred to as "line segment to be approximated". Such an outlining process will be described with reference to FIGS. 14A-14C.

Figure 14A:
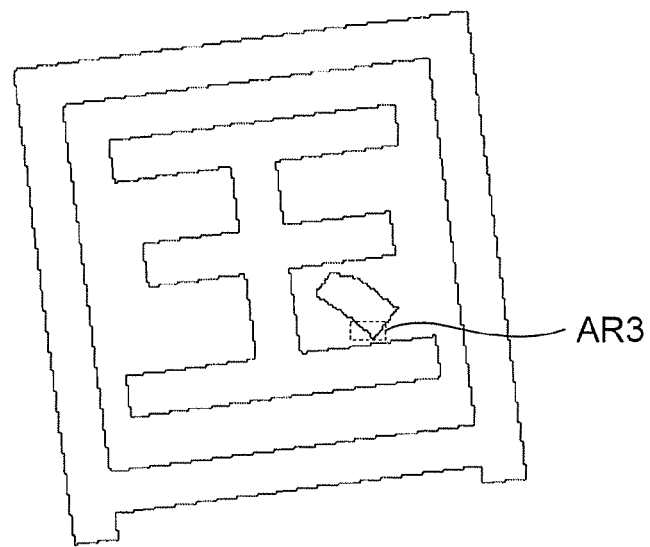
FIGS. 14A, 14B, and 14C are diagrams for explaining steps of an outlining process.
Figure 14B:
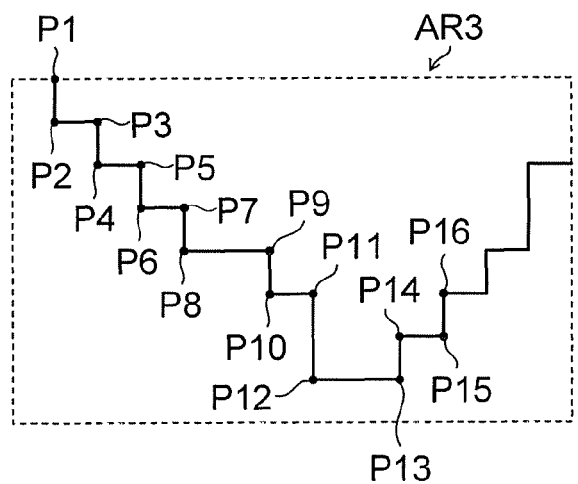

FIG. 14A illustrates an image of contours of the first specific Japanese character. This image can be drawn by connecting together center points of extracted apex pixels. FIG. 14B is an enlarged view of a specific portion AR3 of the image of contours illustrated in FIG. 14A.

In the specific portion AR3, an arbitrary apex is selected as a start point. Here, it is assumed that an apex P1 has been selected as the start point. The start point P1, and an apex P3 that is two spaces away from the start point P1 and that serves as a candidate (end point candidate) for the end point of an approximation line segment, are then selected. A distance from the segment connecting the start point P1 and the apex P3 of the end point candidate (end point candidate apex) to an apex P2 that is an apex lying between the start point P1 and the end point candidate apex P3 is then found. It is then checked whether or not the distance that has been found is less than a predetermined threshold value (straight-line approximation threshold value). In the case where the distance is less, the end point candidate shifts to the next apex, i.e., an apex P4, and the same process is repeated. In other words, distances from the line segment connecting between the start point P1 and the end point candidate P4 to the apexes that lie between the start point P1 and the end point candidate P4, i.e., the apexes P2 and P3, are found. It is then checked whether or not the distances that have been found are less than the straight-line approximation threshold value. In the case where both distances are less than the straight-line approximation threshold value, the end point candidate shifts to the next apex, i.e., apex P5, and the same process is repeated.

The end point candidate apex is sequentially shifted to the next apex until an end point candidate for which any of the distances from the line segment connecting the start point with the end point candidate to the apexes that lie between the start point and the apex of the end point candidate are greater than the straight-line approximation threshold value appears. The end point of the approximation line segment is determined upon one of those distances being equal to or greater than the straight-line approximation threshold. The example in FIG. 14B assumes that when an apex P9 is taken as the end point candidate, the distance from the line segment connecting the start point P1 with the end point candidate P9 to an apex P8 is greater than the straight-line approximation threshold value.

Figure 14C:
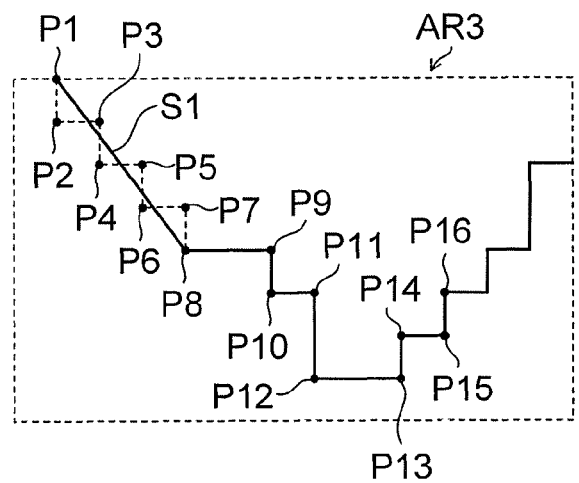

When the end point candidate has been shifted to the apex P9, the distances from a line segment connecting the start point P1 with the end point candidate apex P9 to the individual apexes that lie between the start point P1 and the end point candidate apex P9 are found in the same manner. The distance between that line segment and the apex P8 is greater than the straight-line approximation threshold value, and therefore the end point of the approximation line segment whose start point is the apex P1 is determined at this time. The end point is thus determined to be the apex one previous to the current end point candidate. In the example shown in FIG. 14B, the apex P8, which is one previous to the end point candidate apex P9, is determined to be the end point. Then, the apexes P1 and P8 are recorded as the start point and the end point, respectively, so that the contour formed by the apexes P1-P8 is approximated by a line segment S1 connecting the start point P1 with the end point P9, as shown in FIG. 14C.

Figure 15A:
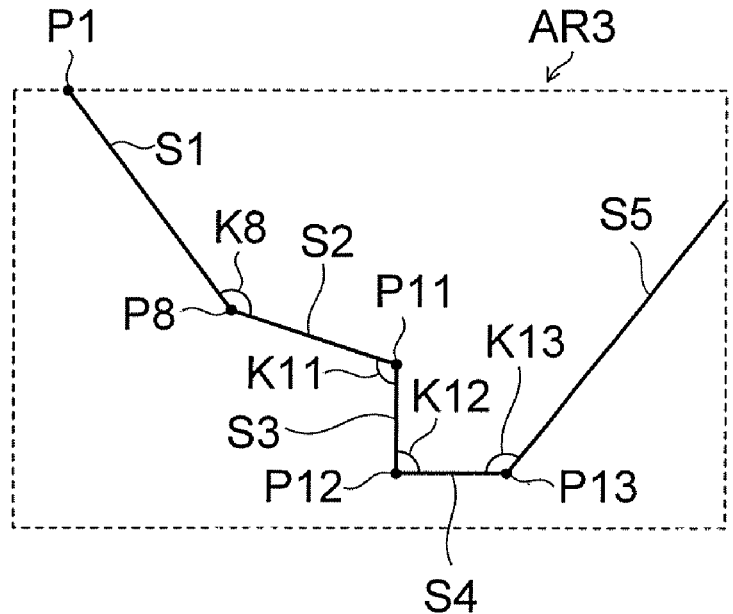
FIGS. 15A and 15B are diagrams for explaining steps of an outlining process.

When the end point has been determined, that end point is then used as the start point of the next approximation line segment, and a process for finding that next approximation line segment is then performed. In other words, the apex P8 is taken as the start point, and an apex two spaces away therefrom, i.e., an apex P10, is taken as an end point candidate; the distances from a line segment that connects the start point P8 with the end point candidate apex P10 to the apexes that lie between the start point P8 and the end point candidate P10 are then found. The end point candidate is shifted and the end point is determined using the same method as has already been described. This process is repeated, and the start points and end points of the approximation line segments are found for all portions to be outlined. By this process, in the case of the example in FIG. 14B, the contours are approximated as illustrated in FIG. 15A.

Next, the contours thus approximated by the straight lines will be subjected to the curve approximation. In such a process, two adjacent approximation line segments are noted from among all the approximation line segments that form the contours. When such two adjacent approximation line segments fulfill the following conditions (C1) and (C2) at the same time, the contour expressed by those two approximation line segments is approximated by a Bezier curve.

(C1) Both of the two approximation line segments are shorter than a predetermined length (curve approximation threshold value).

(C2) The lesser angle formed at the intersection of the two approximation line segments (judgment target angle) is greater than a predetermined angle (approximation threshold angle).

FIG. 15A illustrates a contour of the specific portion AR3 of the first specific Japanese character, formed by approximation line segments S1 to S5. In the example shown in FIG. 15A, judgment target angles K8, K11, and K13 are assumed to be greater than the approximation threshold angle, whereas a judgment target angle K12 is assumed to be smaller than the approximation threshold angle. Furthermore, the lengths of approximation line segments S1, S2, S3, and S4 are assumed to be smaller than the curve approximation threshold value, whereas the approximation line segment S5 is assumed to be longer than the curve approximation threshold value.

In FIG. 15A, regarding the approximation line segments S1 and S2, the lengths of these approximation line segments S1 and S2 are both smaller than the curve approximation threshold value, and thus fulfill the above condition (C1). Furthermore, the judgment target angle K8 is greater than the approximation threshold angle and thus the above condition (2) is fulfilled. In other words, the approximation line segments S1 and S2 fulfill both the above conditions (C1) and (C2), and thus curve approximation is performed on the contour of these approximation line segments. The curve approximation will be performed, for example, in the following manner.

Figure 15B:
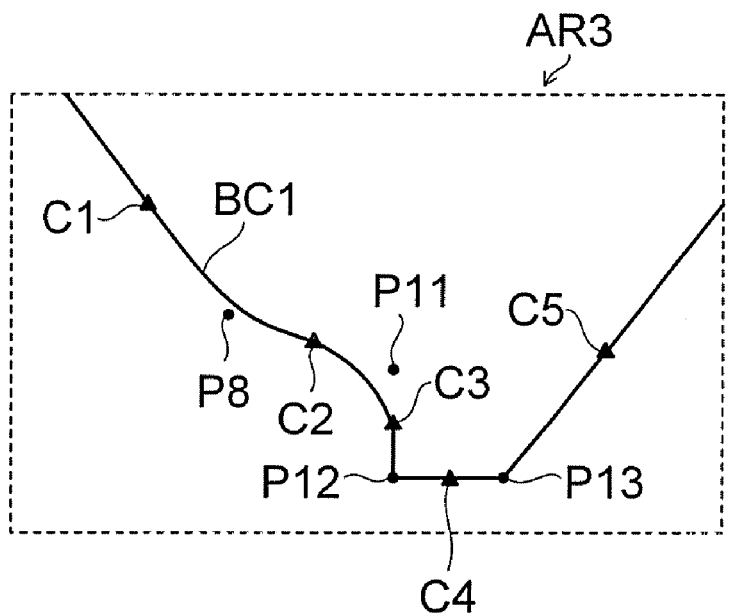

First, midpoints C1 and C2 are found for the approximation line segments S1 and S2, respectively. The midpoints C1 and C2 are then taken as a start point and an end point, respectively, and two other control points are then determined in accordance with a predetermined rule; a Bezier curve BC1 as shown in FIG. 15B is then found. The two control points are assumed to be such points for drawing a Bezier curve that makes contact with the approximation line segment S1 at the midpoint C1 and the approximation line segment S2 at the midpoint C2. For example, the midpoint between the apex P8 and the midpoint C1, and the midpoint between the apex P8 and the midpoint C2, may be taken as the control points. The control points may also be determined to be points based upon which the Bezier curve comes as close as possible to the apex P8.

Next, the approximation line segments S2 and S3 shall be discussed. When these line segments fulfill both the above conditions (C1) and (C2), the curve approximation is therefore performed on the contour of these approximation line segments. In a similar manner, the approximation line segments to be targeted are sequentially shifted, and the contour of the approximation line segments that fulfills both of the above conditions (C1) and (C2) is approximated by a curved line.

The horizontal/vertical line process and outlining process are performed on all the characters included in each block BK in a manner described above, and processed block data DZ, i.e., data of the processed block BK, is outputted to the character compression processing portion 111.

The character compression processing portion 111 compresses the processed block data DZ using a lossless compression technique such as the MMR method.

The resolution reduction portion 112 performs a resolution reduction process on an image of the background extracted by the background extraction portion 102. The background compression processing portion 113 compresses the data of the background after the resolution reduction process is applied thereto, using a lossy compression technique such as the JPEG method.

The file generation portion 114 generates a PDF file by using pieces of compressed data produced by the character compression processing portion 111 and the background compression processing portion 113, respectively. The file storing portion 115 stores the generated PDF file.

In this embodiment, the inclination detection portion may obtain an inclination for each of the extracted blocks BK or an inclination for the document image as a whole. When the inclination for the document image is obtained, for example, the inclination of an arbitrary block BK that has been extracted is obtained, and that inclination is used as the inclination of the document image as a whole. Alternatively, an average value of individual inclination values of the blocks BK is used as the inclination of the document image as a whole.

Figure 16A:
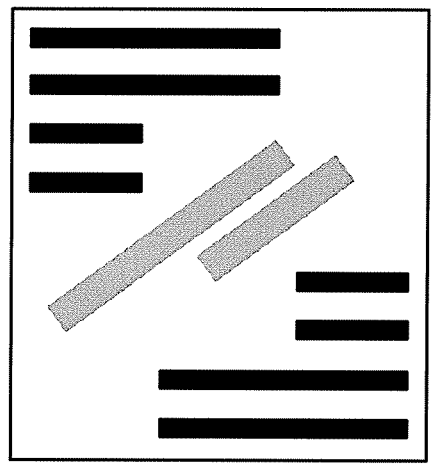
FIGS. 16A and 16B are diagrams illustrating examples of a document image including character strings having different inclinations.
Figure 16B:
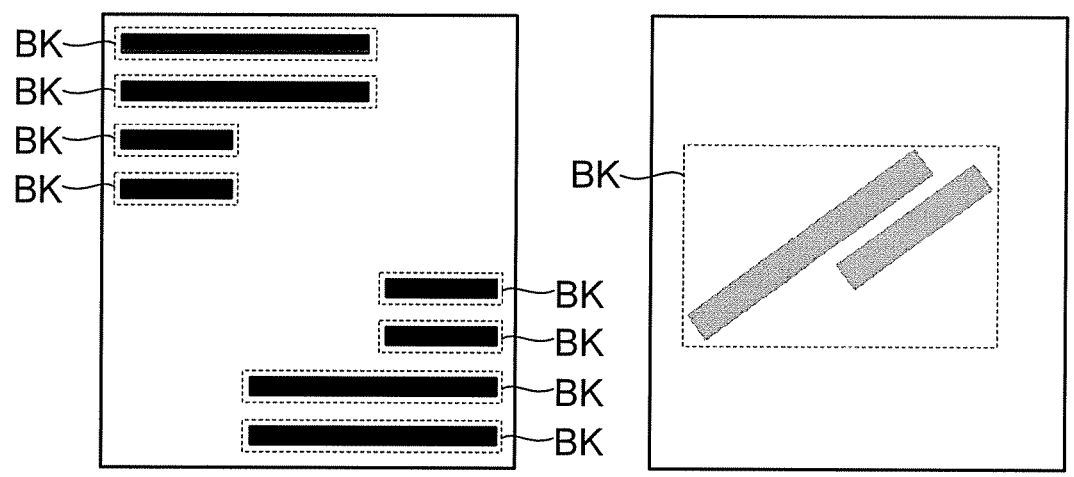
Figure 17A:
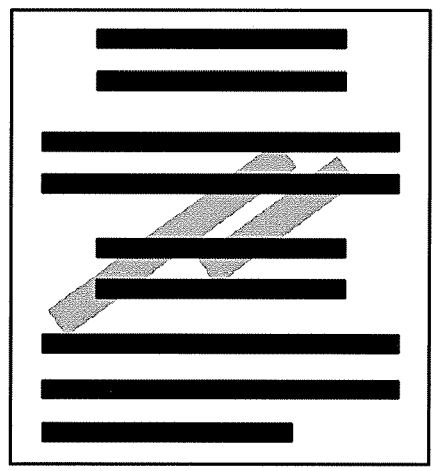
FIGS. 17A and 17B are diagrams illustrating examples of a document image including character strings having different inclinations.
Figure 17B:
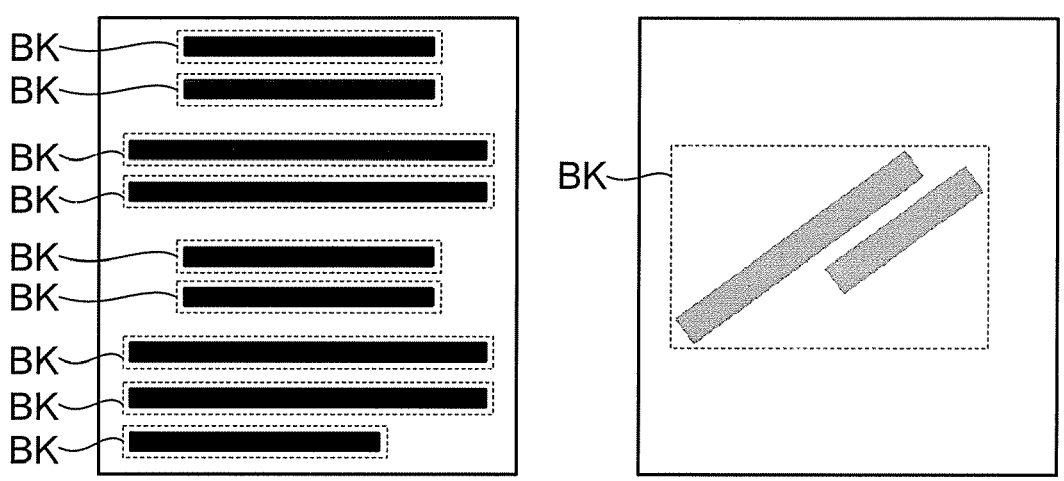

If the inclination is obtained for each block BK, the horizontal/vertical line process can be performed appropriately on such a document image including character strings that have different inclination angles as illustrated in FIG. 16A or 17A. In FIGS. 16A-16C and 17A-17C, each of black and grey bars represents a single line text. For this type of document image including character strings of different inclinations, the blocks BK are extracted for character strings having different inclinations as illustrated in FIGS. 16B and 17B.

Figure 18:
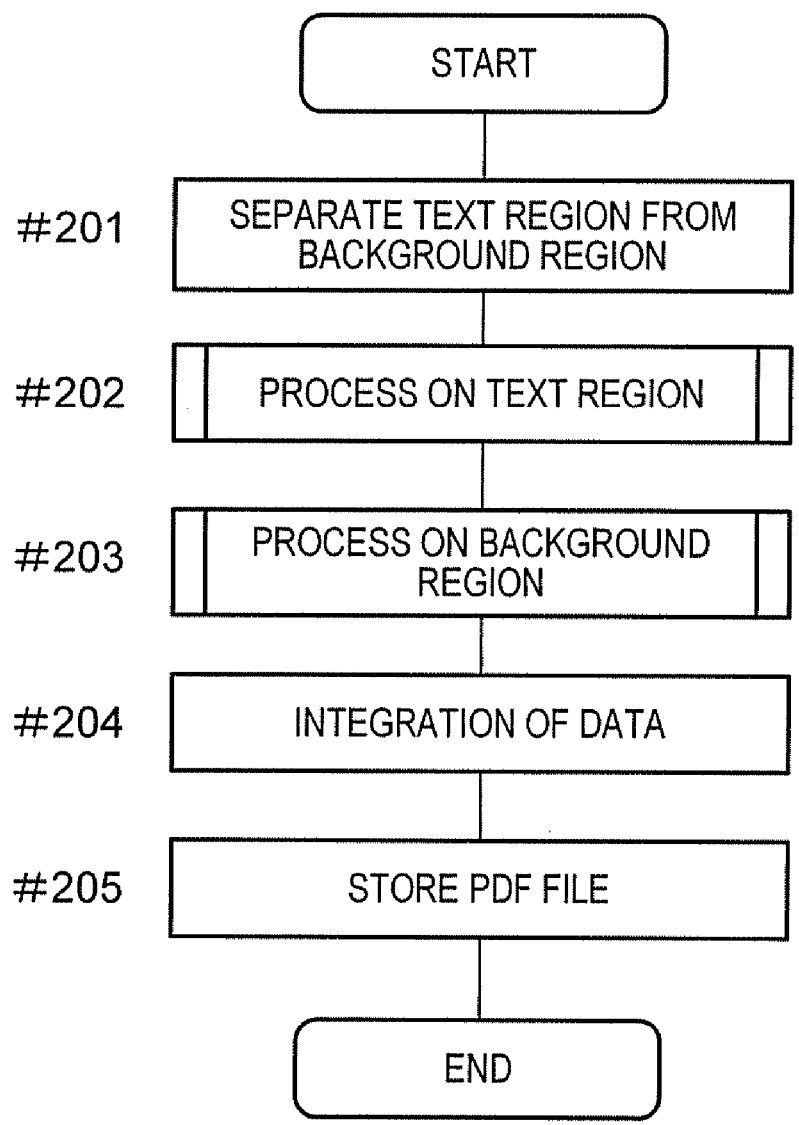
FIG. 18 is a flowchart illustrating an overall flow of processing performed by the image forming apparatus when a PDF file is generated.
Figure 19:
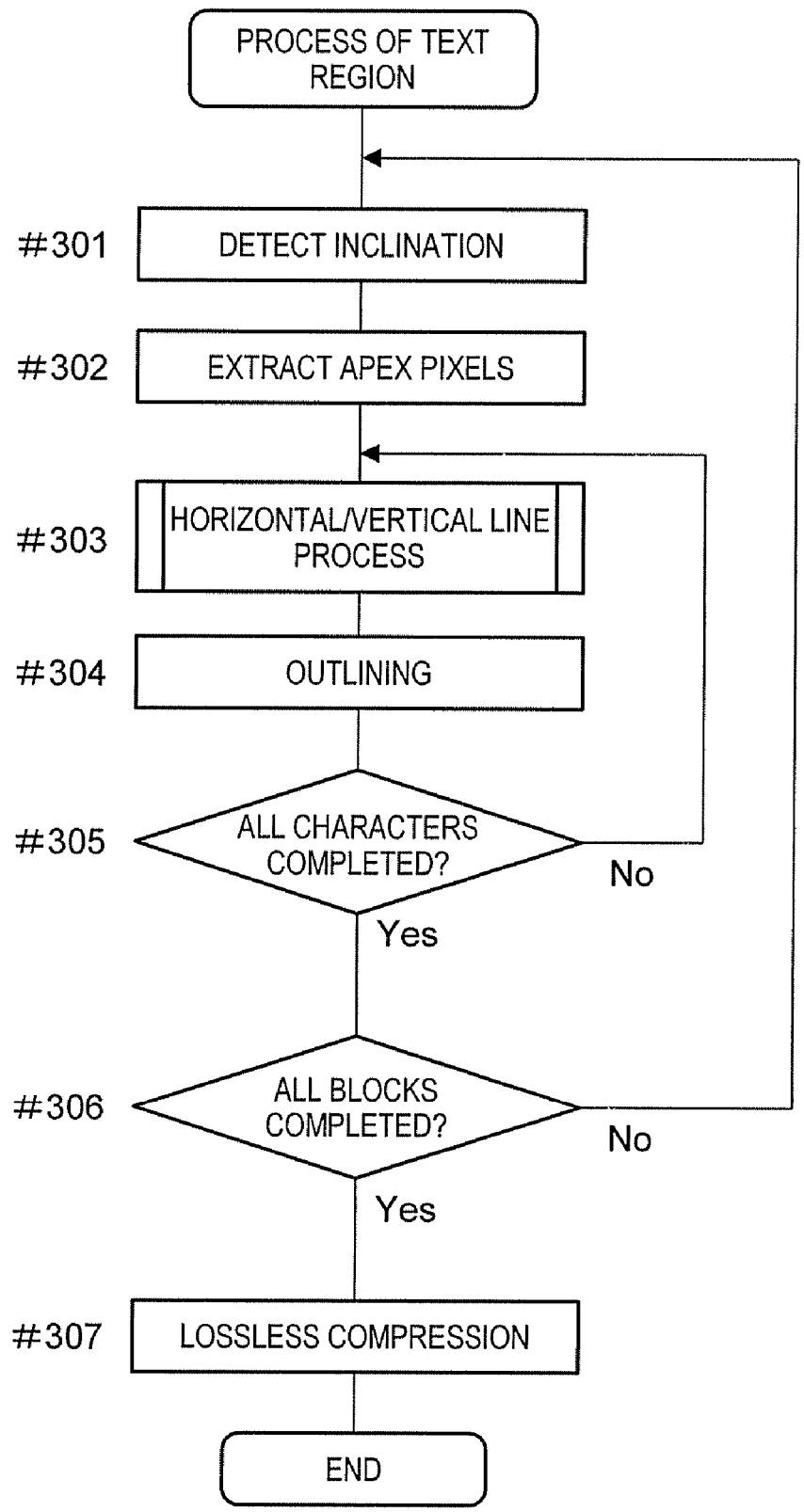
FIG. 19 is a flowchart illustrating a flow of a process performed on a character region.
Figure 20:
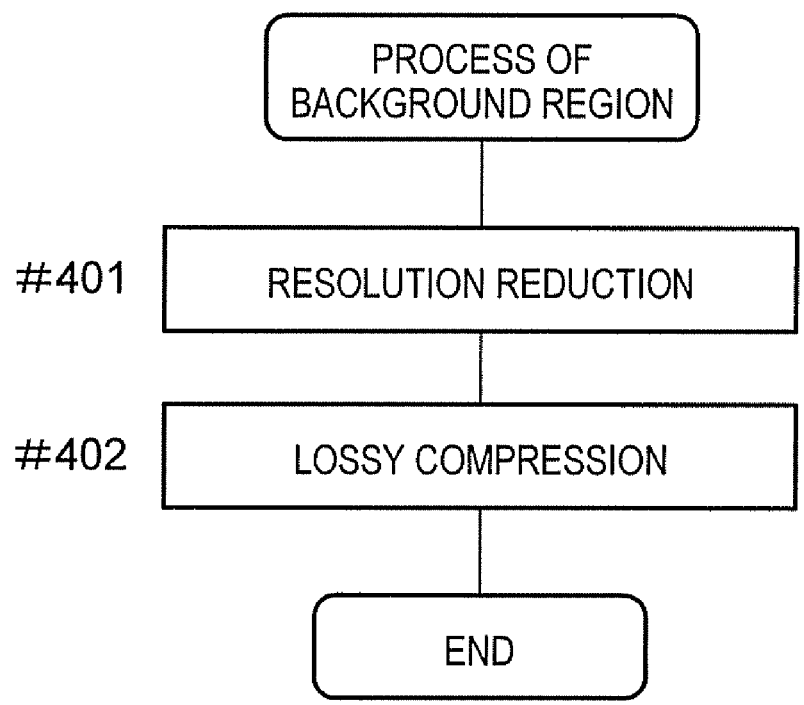
FIG. 20 is a flowchart illustrating a flow of a process performed on a background region.

FIG. 18 is a flowchart illustrating an overall flow of processing performed by the image forming apparatus 1 when a PDF file is generated; FIG. 19 is a flowchart illustrating a flow of processing performed on a character region; and FIG. 20 is a flowchart illustrating a flow of processing performed on a background region.

Next, a description will be given of a flow of a process performed by the image forming apparatus 1 when the document image GD obtained by scanning is converted into a PDF file and stored.

When a user places a document in the scanner 10a, selects a PDF format as a storing format, and instructs the execution of scanning, the image forming apparatus 1 scans the document.

The image forming apparatus 1 separates a text region (block BK) from a background region serving as a background of the text region, both of which are included in the document image data GD obtained by scanning (#201), and performs a different process for each region (#202 and #203). The process performed on the character block BK will be described below.

One block BK to be processed is selected, and the inclination of a character in the block BK is obtained (#301). The apex pixels forming the contours of the character are obtained (#302). The horizontal/vertical line process described with reference to FIG. 8 is performed by using the obtained apex pixels (#303).

Contours other than the portion approximated by the horizontal/vertical line process are subjected to the approximation by straight lines or curved lines through outlining processing (#304).

The processes in steps #303 and #304 are repeated until all the characters in the block BK have been processed (No in #305). Additionally, the processes in steps #301 to #305 are repeated on all of the extracted blocks BK (No in #306).

When the processes on all of the blocks BK are completed (Yes in #306), the data of the blocks BK to which the horizontal/vertical line process and outlining process have been applied is compressed using a lossless compression technique (#307).

The following process is performed on the background region. The image of the background region that has been extracted is subjected to a resolution reduction process (#401 in FIG. 20). The data after the resolution reduction process is compressed using a lossy compression technique (#402).

The data of the block BK which has been compressed using a lossless compression technique and the data of the background region which has been compressed using a lossy compression technique are used to generate a PDF file (#204 in FIG. 18), and the file is stored (#205).

Figure 21A:
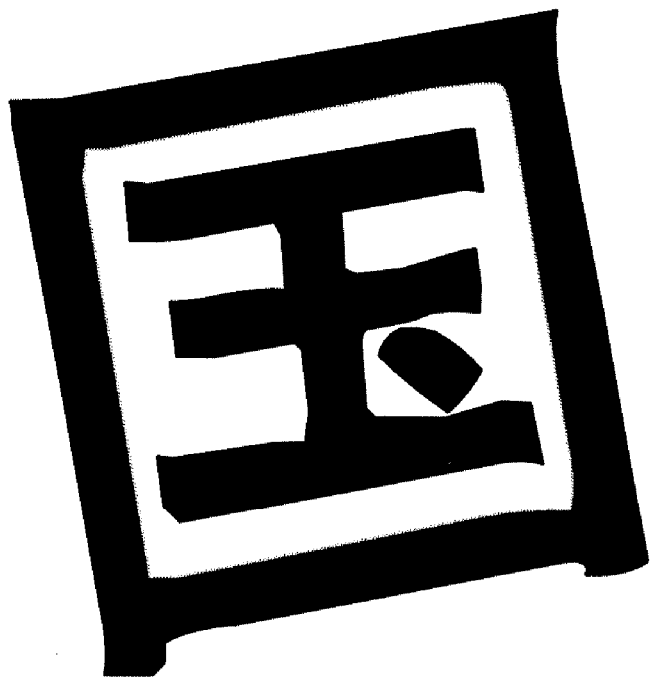
FIGS. 21A and 21B are diagrams illustrating a result obtained by outlining an inclined character.
Figure 21B:
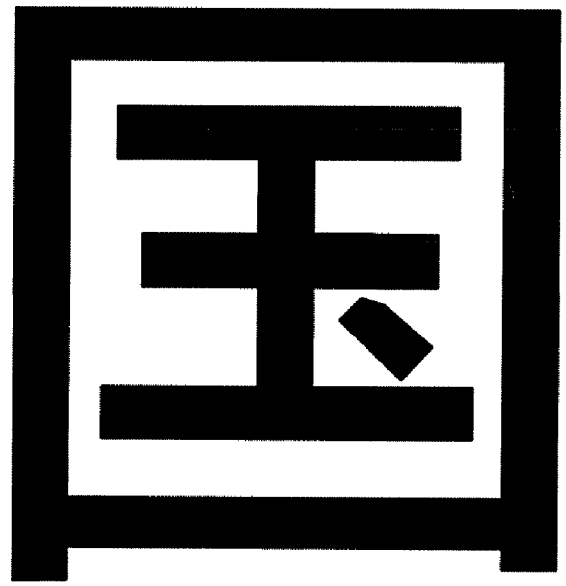
Figure 22:
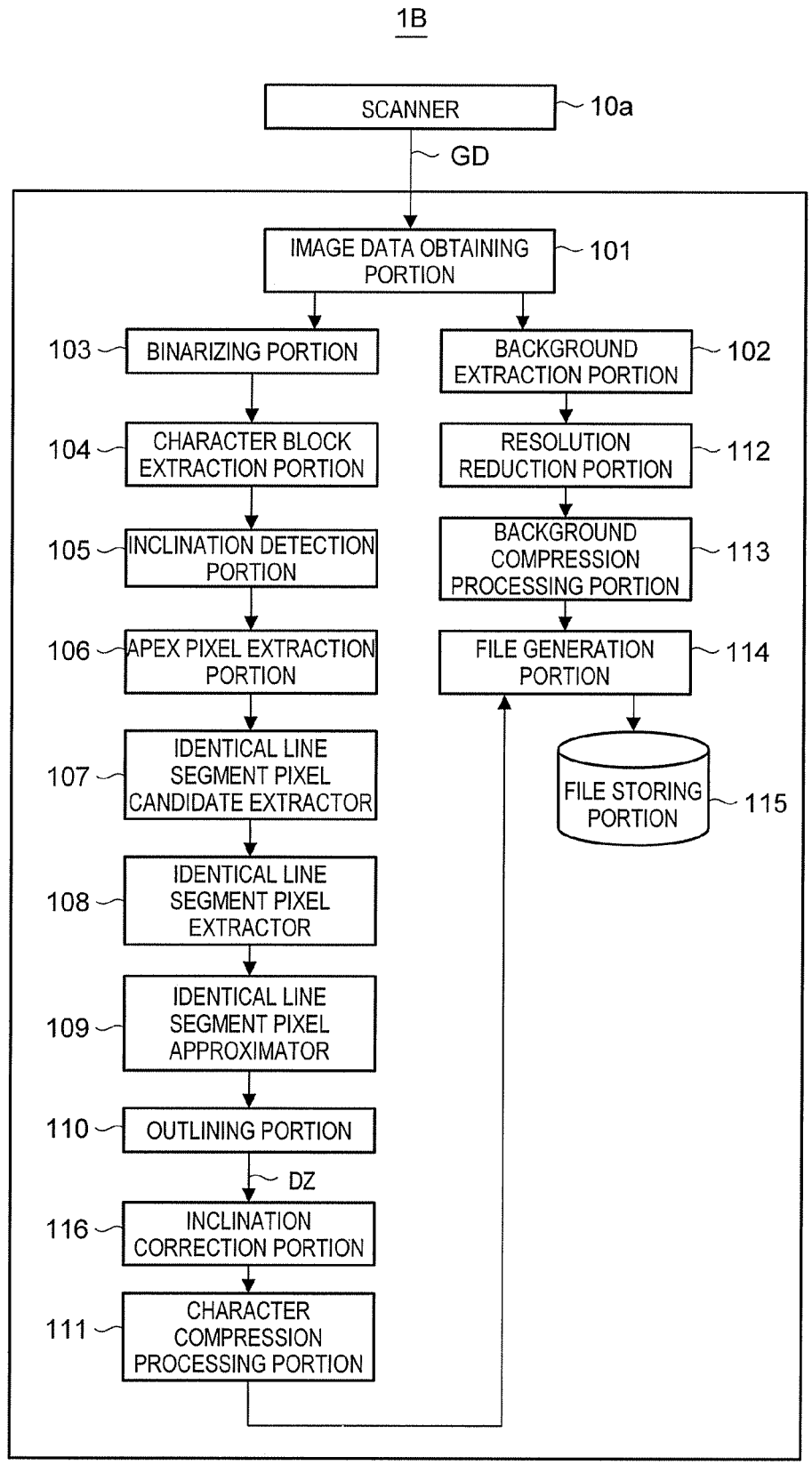
FIG. 22 is a diagram illustrating another configuration example of the image forming apparatus.

FIGS. 21A and 21B are diagrams illustrating a result obtained by outlining an inclined character; and FIG. 22 is a diagram illustrating another configuration example of the image forming apparatus 1.

As described above, according to this embodiment, by performing the horizontal/vertical line process before outlining, a portion that is supposed to be a straight line in a transverse or longitudinal direction among contours of a character, i.e., a portion that is supposed to be expressed by a line segment in a transverse or longitudinal direction, is approximated by a straight line. When the outlining process is performed on an inclined image in a conventional manner, the number of anchor points increases. As a result, the portion that is supposed to be expressed by a single line segment is approximated by a plurality of line segments, which changes the character into a distorted shape as illustrated in FIG. 21A. However, according to this embodiment, the horizontal/vertical line process is performed prior to the outlining process to thereby approximate a portion, which is supposed to be expressed by a line segment in a transverse or longitudinal direction, to a straight line. This makes it possible to shape a character in a better form than that obtained by a conventional method, as illustrated in FIG. 21B. This advantageous effect becomes more noticeable particularly for a character that includes a large number of line segments in transverse and longitudinal directions.

As illustrated in FIG. 22, it is also possible to provide an inclination correction portion 116 after the outlining portion 110 and thereby correct the inclination of a character which has been subjected to the outlining process. In other words, the inclination correction may be implemented after the step #304 in FIG. 19. The inclination correction is performed by a conventional method. For example, a correction using a two-dimensional matrix may be possible.

If the inclination correction is performed on a raster image (image in a bitmap format) before outlining as conventionally practiced, the amount of calculation increases, and it may take a lot of time to implement the inclination correction. To cope with this, it may be conceived to perform the inclination correction after outlining and converting an inclined raster image into a vector image. However, when the outlining process is performed on the inclined image, a character is changed into a distorted shape as illustrated in FIG. 21A. In view of this, a portion that is supposed to be expressed by a single line segment is approximated by a straight line by applying the horizontal/vertical line process, and the image thus approximated undergoes the outlining process. Then, the inclination correction is applied to the vector image which is resulted from outlining. With this arrangement, it is possible to generate a vector image whose inclination is corrected through a simple process without distorting the character as in the conventional case.

An image processing apparatus such as a combination machine or an MFP is used as the image forming apparatus 1 in this embodiment. Instead, a personal computer or a workstation may also be used. Alternatively, an image processing apparatus and a personal computer may be used to share the processing. For example, such processes performed by the background extraction portion 102, the binarizing portion 103, and the character block extraction portion 104 may be implemented by the image processing apparatus, and the other processes may be implemented by the personal computer.

Part of the functions of the various portions in FIG. 2 may be implemented as hardware. For example, the image forming apparatus 1 may be provided with hardware such as an input image processing portion and an output image processing portion. The input image processing portion accepts the document image data GD from the scanner 10a, and performs processes such as color conversion, color correction, resolution conversion, and region determination. The output image processing portion performs processes such as screen control, smoothing, and PWM control.

Finally, the configuration and functions of all or part of the image forming apparatus 1, the details or order of the processing performed thereby, the details of the various pieces of data, and so on can be modified in various ways within the spirit of the present invention. It is to be noted that, although some characters shown in the illustrations in the embodiments are Japanese, such characters may be of English or any other languages.

What is claimed is:

1. A method for generating a vector image in an image processing apparatus, the method comprising the steps of:
    obtaining an inclination of a character included in an image;
    obtaining apex pixels that form contours of the character;
    obtaining, from a portion that is expressed by a single line segment among the contours of the character, an identical line segment candidate pixel group serving as a candidate for a pixel group of the apex pixels that are positioned on the single line segment;
    extracting, based on the inclination, the identical line segment candidate pixel group thus obtained as an identical line segment pixel group that is the pixel group of the apex pixels that are positioned on the single line segment;
    extracting, based on a position of each of the apex pixels of the identical line segment pixel group thus extracted, both-end pixels which are apex pixels located on both sides of the identical line segment pixel group from among the apex pixels of the identical line segment pixel group;
    approximating, by a line segment connecting between the both-end pixels thus extracted, a contour of the character in a portion corresponding to the both-end pixels; and
    approximating a portion among the contours of the character, excluding the portion that has been approximated by the line segment connecting between the both-end pixels, by a straight line or a curved line by performing an outlining process using apex pixels other than the apex pixels of the identical line segment pixel group.

2. The method for generating a vector image according to claim 1,
    wherein the step of extracting the identical line segment candidate pixel group includes:
    obtaining, for each of the apex pixels of the identical line segment candidate pixel group, a pixel-to-straight-line distance which is a distance between a reference straight line which is a straight line defined based on the inclination of the character and said each of the apex pixels of the identical line segment candidate pixel group, and
    extracting, as the identical line segment pixel group, the identical line segment candidate pixel group if the pixel-to-straight-line distance for said each of the apex pixels of the identical line segment candidate pixel group is within a predetermined range.

3. The method for generating a vector image according to claim 2,
    wherein, a straight line having the inclination of the character is used as the reference straight line if the identical line segment candidate pixel group corresponds to a transverse line segment among the contours of the character, and
    a straight line having a right angle to the straight line having the inclination of the character is used as the reference straight line if the identical line segment candidate pixel group corresponds to a longitudinal line segment among the contours of the character.

4. The method for generating a vector image according to claim 3,
    wherein, when the inclination of the character is 45 degrees or smaller, a distance in a vertical direction between the reference straight line and said each of the apex pixels of the identical line segment candidate pixel group is taken as the pixel-to-straight-line distance if the identical line segment candidate pixel group corresponds to a transverse line segment among the contours of the character, and a distance in a horizontal direction between the reference straight line and said each of the apex pixels of the identical line segment candidate pixel group is taken as the pixel-to-straight-line distance if the identical line segment candidate pixel group corresponds to a longitudinal line segment among the contours of the character, and
    wherein, when the inclination of the character is greater than 45 degrees, a distance in a horizontal direction between the reference straight line and said each of the apex pixels of the identical line segment candidate pixel group is taken as the pixel-to-straight-line distance if the identical line segment candidate pixel group corresponds to a transverse line segment among the contours of the character, and a distance in a vertical direction between the reference straight line and said each of the apex pixels of the identical line segment candidate pixel group is taken as the pixel-to-straight-line distance if the identical line segment candidate pixel group corresponds to a longitudinal line segment among the contours of the character.

5. The method for generating a vector image according to claim 1,
wherein, when the apex pixels are positioned in a step-like pattern and at the same time individual distances between the apex pixels that are adjacent to each another are within a predetermined range, a group of the apex pixels is determined and obtained as the identical line segment candidate pixel group.

6. The method for generating a vector image according to claim 1,
wherein, when the character is smaller than a predetermined size and at the same time individual distances between the apex pixels that are adjacent to each other are within a predetermined range, a group of the apex pixels is determined and obtained as the identical line segment candidate pixel group.

7. A method for generating a vector image in an image processing apparatus, the method comprising the steps of:
extracting a character group including one or more characters that are included in an image,
obtaining an inclination of the character group;
obtaining apex pixels that form contours of each of the characters;
obtaining, from a portion that is expressed by a single line segment among the contours of said each of the characters, an identical line segment candidate pixel group serving as a candidate for a pixel group of the apex pixels that are positioned on the single line segment;
extracting, based on the inclination, the identical line segment candidate pixel group thus obtained as an identical line segment pixel group that is the pixel group of the apex pixels that are positioned on the single line segment;
extracting, based on a position of each of the apex pixels of the identical line segment pixel group thus extracted, both-end pixels which are apex pixels located on both sides of the identical line segment pixel group from among the apex pixels of the identical line segment pixel group;
approximating, by a line segment connecting between the both-end pixels thus extracted, a contour of the character in a portion corresponding to the both-end pixels; and
approximating a portion among the contours of the character, excluding the portion that has been approximated by the line segment connecting between the both-end pixels, by a straight line or a curved line by performing an outlining process using apex pixels other than the apex pixels of the identical line segment pixel group.

8. An image processing apparatus that performs a process of converting an image from a raster format to a vector format, comprising:
an inclination detection portion that obtains an inclination of a character included in the image;
an apex pixel extraction portion that obtains apex pixels forming contours of the character;
an identical line segment pixel candidate extractor that obtains, from a portion that is expressed by a single line segment among the contours of the character, an identical line segment candidate pixel group serving as a candidate for a pixel group of the apex pixels that are positioned on the single line segment;
an identical line segment pixel extractor that extracts, based on the inclination obtained by the inclination detection portion, the identical line segment candidate pixel group obtained by the identical line segment pixel candidate extractor as an identical line segment pixel group that is the pixel group of the apex pixels that are positioned on the single line segment;
a both-end pixel extraction portion that extracts, based on a position of each of the apex pixels of the identical line segment pixel group extracted by the identical line segment pixel extractor, both-end pixels which are apex pixels located on both sides of the identical line segment pixel group from among the apex pixels of the identical line segment pixel group;
a first approximation portion that approximates, by a line segment connecting between the both-end pixels extracted by the both-end pixel extraction portion, a contour of the character in a portion corresponding to the both-end pixels; and
a second approximation portion that approximates a portion among the contours of the character, excluding the portion that has been approximated by the line segment connecting between the both-end pixels, by a straight line or a curved line by performing an outlining process using apex pixels other than the apex pixels of the identical line segment pixel group.

9. The image processing apparatus according to claim 8,
wherein the identical line segment pixel extractor obtains, for each of the apex pixels of the identical line segment candidate pixel group, a pixel-to-straight-line distance which is a distance between a reference straight line which is a straight line defined based on the inclination of the character and said each of the apex pixels of the identical line segment candidate pixel group, and extracts, as the identical line segment pixel group, the identical line segment candidate pixel group if the pixel-to-straight-line distance for said each of the apex pixels of the identical line segment candidate pixel group is within a predetermined range.

10. The image processing apparatus according to claim 9,
wherein, a straight line having the inclination of the character is used as the reference straight line if the identical line segment candidate pixel group corresponds to a transverse line segment among the contours of the character, and
a straight line having a right angle to the straight line having the inclination of the character is used as the reference straight line if the identical line segment candidate pixel group corresponds to a longitudinal line segment among the contours of the character.

11. The image processing apparatus according to claim 10,
wherein, when the inclination of the character is 45 degrees or smaller, a distance in a vertical direction between the reference straight line and said each of the apex pixels of the identical line segment candidate pixel group is taken as the pixel-to-straight-line distance if the identical line segment candidate pixel group corresponds to a transverse line segment among the contours of the character, and a distance in a horizontal direction between the reference straight line and said each of the apex pixels of the identical line segment candidate pixel group is taken as the pixel-to-straight-line distance if the identical line segment candidate pixel group corresponds to a longitudinal line segment among the contours of the character, and
wherein, when the inclination of the character is greater than 45 degrees, a distance in a horizontal direction between the reference straight line and said each of the apex pixels of the identical line segment candidate pixel group is taken as the pixel-to-straight-line distance if the identical line segment candidate pixel group corresponds to a transverse line segment among the contours of the character, and a distance in a vertical direction between the reference straight line and said each of the apex pixels of the identical line segment candidate pixel group is taken as the pixel-to-straight-line distance if the identical line segment candidate pixel group corresponds to a longitudinal line segment among the contours of the character.

12. The image processing apparatus according to claim 8, wherein, when the apex pixels are positioned in a step-like pattern and at the same time individual distances between the apex pixels that are adjacent to each another are within a predetermined range, a group of the apex pixels is determined and obtained as the identical line segment candidate pixel group.

13. The image processing apparatus according to claim 8, wherein, when the character is smaller than a predetermined size and at the same time individual distances between the apex pixels that are adjacent to each another are within a predetermined range, a group of the apex pixels is determined and obtained as the identical line segment candidate pixel group.

14. A non-transitory computer-readable storage medium storing thereon a computer program executed by a computer that performs a process of converting an image from a raster format to a vector format, the computer program causing the computer to perform the steps of:
    obtaining an inclination of a character included in an image;
    obtaining apex pixels that form contours of the character;
    obtaining, from a portion that is expressed by a single line segment among the contours of the character, an identical line segment candidate pixel group serving as a candidate for a pixel group of the apex pixels that are positioned on the single line segment;
    extracting, based on the inclination, the identical line segment candidate pixel group thus obtained as an identical line segment pixel group that is the pixel group of the apex pixels that are positioned on the single line segment;
    extracting, based on a position of each of the apex pixels of the identical line segment pixel group thus extracted, both-end pixels which are apex pixels located on both sides of the identical line segment pixel group from among the apex pixels of the identical line segment pixel group;
    approximating, by a line segment connecting between the both-end pixels thus extracted, a contour of the character in a portion corresponding to the both-end pixels; and
    approximating a portion among the contours of the character, excluding the portion that has been approximated by the line segment connecting between the both-end pixels, by a straight line or a curved line by performing an outlining process using apex pixels other than the apex pixels of the identical line segment pixel group.

15. The non-transitory computer-readable storage medium according to claim 14,
    wherein the step of extracting the identical line segment candidate pixel group includes:
    obtaining, for each of the apex pixels of the identical line segment candidate pixel group, a pixel-to-straight-line distance which is a distance between a reference straight line which is a straight line defined based on the inclination of the character and said each of the apex pixels of the identical line segment candidate pixel group, and
    extracting, as the identical line segment pixel group, the identical line segment candidate pixel group if the pixel-to-straight-line distance for said each of the apex pixels of the identical line segment candidate pixel group is within a predetermined range.

16. The non-transitory computer-readable storage medium according to claim 15,
    wherein, a straight line having the inclination of the character is used as the reference straight line if the identical line segment candidate pixel group corresponds to a transverse line segment among the contours of the character, and
    a straight line having a right angle to the straight line having the inclination of the character is used as the reference straight line if the identical line segment candidate pixel group corresponds to a longitudinal line segment among the contours of the character.

17. The non-transitory computer-readable storage medium according to claim 16,
    wherein, when the inclination of the character is 45 degrees or smaller, a distance in a vertical direction between the reference straight line and said each of the apex pixels of the identical line segment candidate pixel group is taken as the pixel-to-straight-line distance if the identical line segment candidate pixel group corresponds to a transverse line segment among the contours of the character, and a distance in a horizontal direction between the reference straight line and said each of the apex pixels of the identical line segment candidate pixel group is taken as the pixel-to-straight-line distance if the identical line segment candidate pixel group corresponds to a longitudinal line segment among the contours of the character, and
    wherein, when the inclination of the character is greater than 45 degrees, a distance in a horizontal direction between the reference straight line and said each of the apex pixels of the identical line segment candidate pixel group is taken as the pixel-to-straight-line distance if the identical line segment candidate pixel group corresponds to a transverse line segment among the contours of the character, and a distance in a vertical direction between the reference straight line and said each of the apex pixels of the identical line segment candidate pixel group is taken as the pixel-to-straight-line distance if the identical line segment candidate pixel group corresponds to a longitudinal line segment among the contours of the character.

18. The non-transitory computer-readable storage medium according to claim 14,
    wherein, when the apex pixels are positioned in a step-like pattern and at the same time individual distances between the apex pixels that are adjacent to each another are within a predetermined range, a group of the apex pixels is determined and obtained as the identical line segment candidate pixel group.

19. The non-transitory computer-readable storage medium according to claim 14,
    wherein, when the character is smaller than a predetermined size and at the same time individual distances between the apex pixels that are adjacent to each another are within a predetermined range, a group of the apex pixels is determined and obtained as the identical line segment candidate pixel group.

* * * * *